US012652662B2

(12) United States Patent
Zhang

(10) Patent No.: US 12,652,662 B2
(45) Date of Patent: Jun. 9, 2026

(54) COMMUNICATION METHOD AND APPARATUS

(71) Applicant: Huawei Technologies Co., Ltd., Shenzhen (CN)

(72) Inventor: Di Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 709 days.

(21) Appl. No.: 17/887,265

(22) Filed: Aug. 12, 2022

(65) Prior Publication Data

US 2022/0394701 A1      Dec. 8, 2022

Related U.S. Application Data

(63) Continuation of application No. PCT/CN2020/075424, filed on Feb. 14, 2020.

(51) Int. Cl.
*H04W 72/044*        (2023.01)
(52) U.S. Cl.
CPC ................................. *H04W 72/046* (2013.01)
(58) Field of Classification Search
USPC .............................................. 455/450–452.1
See application file for complete search history.

(56) References Cited

U.S. PATENT DOCUMENTS

2010/0124919 A1      5/2010   Ko et al.
2019/0199496 A1      6/2019   Qin et al.

2019/0349059 A1 *   11/2019   John Wilson et al. ......................
                                        H04B 7/0695
2021/0051692 A1 *    2/2021   Chen ................ H04W 72/0446
2021/0058113 A1 *    2/2021   Jung ................... H04B 7/0695
2022/0224479 A1 *    7/2022   He ........................ H04L 5/0032

FOREIGN PATENT DOCUMENTS

CN        107888266 A      4/2018
CN        108024365 A      5/2018

OTHER PUBLICATIONS

Translation of KR-10-2019-0122630 Application (Year: 2019).*
"Enhancements on Multi-beam Operation," 3GPP TSG RAN WG1 #98, Prague, Czech Republic, R1-1909210, Total 18 pages, XP051765815, 3rd Generation Partnership Project, Valbonne, France (Aug. 26-30, 2019).

(Continued)

*Primary Examiner* — Suhail Khan
(74) *Attorney, Agent, or Firm* — Leydig, Voit & Mayer, Ltd.

(57)                    ABSTRACT

Embodiments of this application provide a communication method and apparatus, and relate to the communication field, to resolve problems of high signaling overheads and a low update speed when beams corresponding to different signals/channels are updated. The method includes: receiving first indication information that indicates spatial parameter information of at least two types of signals and sending and/or receiving the at least two types of signals based on the spatial parameter information. Embodiments of this application are applied to various communication systems, for example, a 5G communication system.

16 Claims, 9 Drawing Sheets

(56) References Cited

OTHER PUBLICATIONS

"On beam indication, measurement, and reporting," 3GPP TSG-RAN WG1 NR Ad Hoc #3, Nagoya, Japan, R1-1716350, Total 13 pages, XP051339805, 3rd Generation Partnership Project, Valbonne, France (Sep. 18-21, 2017).

Ericsson, "Enhancements to multi-beam operation," 3GPP TSG-RAN WG1 Meeting #96, Athens, Greece, R1-1903231, Total 15 pages, 3rd Generation Partnership Project, Valbonne, France (Feb. 25-Mar. 1, 2019).

Samsung, "New WID: Further enhancements on MIMO for NR," 3GPP TSG RAN Meeting #86, RP-193133, Sitges, Spain, Total 5 pages, 3rd Generation Partnership Project, Valbonne, France (Dec. 9-12, 2019).

* cited by examiner

| Serving cell ID | | | | | | | BWP ID | R |
|---|---|---|---|---|---|---|---|---|
| $T_7$ | $T_6$ | $T_5$ | $T_4$ | $T_3$ | $T_2$ | $T_1$ | $T_0$ | |
| $T_{15}$ | $T_{14}$ | $T_{13}$ | $T_{12}$ | $T_{11}$ | $T_{10}$ | $T_{19}$ | $T_{18}$ | |

...

| | | | | | | | |
|---|---|---|---|---|---|---|---|
| $T_{(N-2)*8+7}$ | $T_{(N-2)*8+6}$ | $T_{(N-2)*8+5}$ | $T_{(N-2)*8+4}$ | $T_{(N-2)*8+3}$ | $T_{(N-2)*8+2}$ | $T_{(N-2)*8+1}$ | $T_{(N-2)*8}$ |

COMMUNICATION METHOD AND APPARATUS

CROSS-REFERENCE TO RELATED APPLICATIONS

This application is a continuation of International Application No. PCT/CN2020/075424, filed on Feb. 14, 2020, the disclosure of which is hereby incorporated by reference in its entirety.

TECHNICAL FIELD

This application relates to the communication field, and in particular, to a communication method and apparatus.

BACKGROUND

With development of communication systems, a beamforming technology is increasingly widely applied. The beamforming technology is a technology in which a communication device generates a directional beam by adjusting a weighting coefficient of an antenna in an antenna array. A large antenna gain may be obtained by using the beamforming technology, to compensate for a signal loss in a signal transmission process.

When a signal is transmitted based on the beamforming technology, for example, during transmission of a downlink signal, once a terminal device moves, both a transmission beam (a sending beam) of a network device and a reception beam of the terminal device may dynamically change, and the network device needs to separately update, by using a plurality of pieces of signaling, beams corresponding to different signals/channels. Consequently, signaling overheads are high, and an update speed is slow.

SUMMARY

Embodiments of this application provide a communication method and apparatus, to resolve problems of high signaling overheads and a low update speed when beams corresponding to different signals/channels are updated.

According to a first aspect, embodiments of this application provide a communication method, including: receiving first indication information, where the first indication information indicates spatial parameter information of at least two types of signals; and sending and/or receiving the at least two types of signals based on the spatial parameter information.

According to a second aspect, embodiments of this application provide a communication method, including: receiving first indication information, where the first indication information indicates spatial parameter information of one of at least two types of signals; and sending and/or receiving the at least two types of signals based on the spatial parameter information.

According to the method provided in embodiments of this application, a terminal device may receive the first indication information, and send and/or receive the at least two types of signals based on the spatial parameter information indicated by the first indication information. In a current technology, a base station needs to separately update, by using a plurality of pieces of signaling, beams corresponding to different signals/channels, signaling overheads are high, and an update speed is slow. In this application, the terminal device can send and/or receive the at least two types of signals based on the first indication information, so that the terminal device can quickly complete a beam handover for a plurality of types of signals in a movement scenario, to effectively avoid link interruption and reduce signaling.

In a possible design of the first aspect or the second aspect, the at least two types of signals include at least two of a physical uplink control channel (PUCCH), a physical uplink shared channel (PUSCH), a sounding reference signal (SRS), a phase tracking reference signal (PTRS), a demodulation reference signal (DMRS), a physical downlink control channel (PDCCH), a physical downlink shared channel (PDSCH), a tracking reference signal (TRS), a channel state information-reference signal (CSI-RS), or a synchronization signal block (SSB).

It should be understood that the at least two types of signals may include any two types of signals, any three types of signals, any four types of signals, any five types of signals, or the like, of the PUCCH, the PUSCH, the SRS, the PTRS, the DMRS, the PDCCH, the PDSCH, the TRS, the CSI-RS, or the SSB. This is not limited in this application.

In a possible design of the first aspect or the second aspect, the first indication information is carried in a target field in downlink control information (DCI). For example, one target field may be added to DCI in a format 1-1 in the release-16 (Rel-16) standard protocol 38.212 to carry the first indication information. For another example, another field may be reused in the DCI in the format 1-1 in the Rel-16 standard protocol 38.212 to carry the first indication information.

In a possible design of the first aspect or the second aspect, the target field is a transmission configuration indicator (TCI) field.

In a possible design of the first aspect or the second aspect, the first indication information is carried in radio resource control (RRC) signaling or media access control element (MAC CE) signaling.

In a possible design of the first aspect or the second aspect, the spatial parameter information takes effect after a target time period, and the target time period is related to a capability of the terminal device.

In a possible design of the first aspect or the second aspect, the method further includes: reporting capability information, where the capability information indicates the target time period.

In a possible design of the first aspect or the second aspect, a length of the target time period is determined based on a quantity of time units of the target time period and a minimum value of a subcarrier spacing (SCS) of the at least two types of signals.

In a possible design of the first aspect or the second aspect, if the at least two types of signals include at least one uplink signal and at least one downlink signal, the sending and/or receiving the at least two types of signals based on the spatial parameter information includes: receiving the at least one downlink signal based on the spatial parameter information, where a length of the target time period is determined based on a quantity of time units of the target time period and a minimum value of an SCS of the at least one downlink signal; and sending the at least one uplink signal based on the spatial parameter information, where the length of the target time period is determined based on the quantity of time units of the target time period and a minimum value of an SCS of the at least one uplink signal.

In a possible design of the first aspect or the second aspect, if the at least two types of signals include a first signal, the sending and/or receiving the at least two types of signals based on the spatial parameter information includes: sending or receiving the first signal based on the spatial parameter information, where a length of the target time period is determined based on a quantity of time units of the target time period and an SCS of the first signal.

In a possible design of the first aspect or the second aspect, if the at least two types of signals include a first signal, the sending and/or receiving the at least two types of signals based on the spatial parameter information includes: sending and/or receiving the at least two types of signals based on the spatial parameter information, where a length of the target time period is determined based on a quantity of time units of the target time period and an SCS of the first signal.

In a possible design of the first aspect or the second aspect, any one of the at least two types of signals is indicated by using RRC signaling or MAC CE signaling, or is predefined.

In a possible design of the first aspect or the second aspect, when the first indication information indicates a plurality of pieces of spatial parameter information, at least one of the at least two types of signals corresponds to a first piece of spatial parameter information in the plurality of pieces of spatial parameter information.

In a possible design of the first aspect or the second aspect, when the at least two types of signals include the uplink signal, spatial parameter information of the uplink signal is type D quasi-colocation (QCL) information (type D QCL information).

In a possible design of the first aspect or the second aspect, the method further includes: receiving second indication information, where the second indication information indicates to obtain the first indication information.

According to a third aspect, embodiments of this application provide a communication method, including: sending first indication information, where the first indication information indicates spatial parameter information of at least two types of signals; and sending and/or receiving the at least two types of signals based on the spatial parameter information.

According to a fourth aspect, embodiments of this application provide a communication method, including: sending first indication information, where the first indication information indicates spatial parameter information of one of at least two types of signals; and sending and/or receiving the at least two types of signals based on the spatial parameter information.

According to the method provided in embodiments of this application, a network device may send the first indication information to a terminal device, so that the terminal device can send and/or receive the at least two types of signals based on spatial parameter information indicated by the first indication information. In a current technology, a base station needs to separately update, by using a plurality of pieces of signaling, beams corresponding to different signals/channels, signaling overheads are high, and an update speed is slow. In embodiments of this application, the network device sends the first indication information to the terminal device, so that the terminal device can send and/or receive the at least two types of signals based on the first indication information. Therefore, the terminal device can quickly complete a beam handover for a plurality of types of signals in a movement scenario, to effectively avoid link interruption and reduce signaling.

In a possible design of the third aspect or the fourth aspect, the at least two types of signals include at least two of a PUCCH, a PUSCH, an SRS, a PTRS, a DMRS, a PDCCH, a PDSCH, a TRS, a CSI-RS, or an SSB.

In a possible design of the third aspect or the fourth aspect, the first indication information is carried in a target field in DCI.

In a possible design of the third aspect or the fourth aspect, the target field is a TCI field.

In a possible design of the third aspect or the fourth aspect, the first indication information is carried in RRC signaling or MAC CE signaling.

In a possible design of the third aspect or the fourth aspect, the spatial parameter information takes effect after a target time period, and the target time period is related to a capability of the terminal device.

In a possible design of the third aspect or the fourth aspect, the method further includes: receiving capability information, where the capability information indicates the target time period.

In a possible design of the third aspect or the fourth aspect, a length of the target time period is determined based on a quantity of time units of the target time period and a minimum value of a subcarrier spacing SCS of the at least two types of signals.

In a possible design of the third aspect or the fourth aspect, if the at least two types of signals include at least one uplink signal and at least one downlink signal, the sending and/or receiving the at least two types of signals based on the spatial parameter information includes: sending the at least one downlink signal based on the spatial parameter information, where a length of the target time period is determined based on a quantity of time units of the target time period and a minimum value of an SCS of the at least one downlink signal; and receiving the at least one uplink signal based on the spatial parameter information, where the length of the target time period is determined based on the quantity of time units of the target time period and a minimum value of an SCS of the at least one uplink signal.

In a possible design of the third aspect or the fourth aspect, if the at least two types of signals include a first signal, the sending and/or receiving the at least two types of signals based on the spatial parameter information includes: sending or receiving the first signal based on the spatial parameter information, where a length of the target time period is determined based on a quantity of time units of the target time period and an SCS of the first signal.

In a possible design of the third aspect or the fourth aspect, if the at least two types of signals include a first signal, the sending and/or receiving the at least two types of signals based on the spatial parameter information includes: sending and/or receiving the at least two types of signals based on the spatial parameter information, where a length of the target time period is determined based on a quantity of time units of the target time period and an SCS of the first signal.

In a possible design of the third aspect or the fourth aspect, any one of the at least two types of signals is indicated by using RRC signaling or MAC CE signaling, or is predefined.

In a possible design of the third aspect or the fourth aspect, when the first indication information indicates a plurality of pieces of spatial parameter information, at least one of the at least two types of signals corresponds to a first piece of spatial parameter information in the plurality of pieces of spatial parameter information.

In a possible design of the third aspect or the fourth aspect, when the at least two types of signals include the uplink signal, spatial parameter information of the uplink signal is type D quasi-colocation QCL information.

In a possible design of the third aspect or the fourth aspect, the method further includes: sending second indication information, where the second indication information indicates to send the first indication information.

According to a fifth aspect, embodiments of this application provide a communication apparatus, including a transceiver unit. The transceiver unit is configured to receive first indication information, where the first indication information indicates spatial parameter information of at least two types of signals; and the transceiver unit is further configured to send and/or receive the at least two types of signals based on the spatial parameter information.

According to a sixth aspect, embodiments of this application provide a communication apparatus, including a transceiver unit. The transceiver unit is configured to receive first indication information, where the first indication information indicates spatial parameter information of one of at least two types of signals; and the transceiver unit is further configured to send and/or receive the at least two types of signals based on the spatial parameter information.

In a possible design of the fifth aspect or the sixth aspect, the at least two types of signals include at least two of a PUCCH, a PUSCH, an SRS, a PTRS, a DMRS, a PDCCH, a PDSCH, a TRS, a CSI-RS, or an SSB.

In a possible design of the fifth aspect or the sixth aspect, the first indication information is carried in a target field in DCI.

In a possible design of the fifth aspect or the sixth aspect, the target field is a TCI field.

In a possible design of the fifth aspect or the sixth aspect, the first indication information is carried in RRC signaling or MAC CE signaling.

In a possible design of the fifth aspect or the sixth aspect, the spatial parameter information takes effect after a target time period, and the target time period is related to a capability of a terminal device.

In a possible design of the fifth aspect or the sixth aspect, the transceiver unit is further configured to report capability information, where the capability information indicates the target time period.

In a possible design of the fifth aspect or the sixth aspect, a length of the target time period is determined based on a quantity of time units of the target time period and a minimum value of an SCS of the at least two types of signals.

In a possible design of the fifth aspect or the sixth aspect, if the at least two types of signals include at least one uplink signal and at least one downlink signal, the transceiver unit is configured to: receive the at least one downlink signal based on the spatial parameter information, where a length of the target time period is determined based on a quantity of time units of the target time period and a minimum value of an SCS of the at least one downlink signal; and send the at least one uplink signal based on the spatial parameter information, where the length of the target time period is determined based on the quantity of time units of the target time period and a minimum value of an SCS of the at least one uplink signal.

In a possible design of the fifth aspect or the sixth aspect, if the at least two types of signals include a first signal, the transceiver unit is configured to send or receive the first signal based on the spatial parameter information, where a length of the target time period is determined based on a quantity of time units of the target time period and an SCS of the first signal.

In a possible design of the fifth aspect or the sixth aspect, if the at least two types of signals include a first signal, the transceiver unit is configured to send and/or receive the at least two types of signals based on the spatial parameter information, where a length of the target time period is determined based on a quantity of time units of the target time period and an SCS of the first signal.

In a possible design of the fifth aspect or the sixth aspect, any one of the at least two types of signals is indicated by using RRC signaling or MAC CE signaling, or is predefined.

In a possible design of the fifth aspect or the sixth aspect, when the first indication information indicates a plurality of pieces of spatial parameter information, at least one of the at least two types of signals corresponds to a first piece of spatial parameter information in the plurality of pieces of spatial parameter information.

In a possible design of the fifth aspect or the sixth aspect, when the at least two types of signals include the uplink signal, spatial parameter information of the uplink signal is type D quasi-colocation QCL information.

In a possible design of the fifth aspect or the sixth aspect, the transceiver unit is further configured to receive second indication information, where the second indication information indicates to obtain the first indication information.

According to a seventh aspect, embodiments of this application provide a communication apparatus, including a transceiver unit. The transceiver unit is configured to send first indication information, where the first indication information indicates spatial parameter information of at least two types of signals; and the transceiver unit is further configured to send and/or receive the at least two types of signals based on the spatial parameter information.

According to an eighth aspect, embodiments of this application provide a communication apparatus, including a transceiver unit. The transceiver unit is configured to send first indication information, where the first indication information indicates spatial parameter information of one of at least two types of signals; and the transceiver unit is further configured to send and/or receive the at least two types of signals based on the spatial parameter information.

In a possible design of the seventh aspect or the eighth aspect, the at least two types of signals include at least two of a PUCCH, a PUSCH, an SRS, a PTRS, a DMRS, a PDCCH, a PDSCH, a TRS, a CSI-RS, or an SSB.

In a possible design of the seventh aspect or the eighth aspect, the first indication information is carried in a target field in downlink control information DCI.

In a possible design of the seventh aspect or the eighth aspect, the target field is a transmission configuration indicator TCI field.

In a possible design of the seventh aspect or the eighth aspect, the first indication information is carried in radio resource control RRC signaling or media access control element MAC CE signaling.

In a possible design of the seventh aspect or the eighth aspect, the spatial parameter information takes effect after a target time period, and the target time period is related to a capability of a terminal device.

In a possible design of the seventh aspect or the eighth aspect, the transceiver unit is further configured to receive capability information, where the capability information indicates the target time period.

In a possible design of the seventh aspect or the eighth aspect, a length of the target time period is determined based on a quantity of time units of the target time period and a minimum value of a subcarrier spacing SCS of the at least two types of signals.

In a possible design of the seventh aspect or the eighth aspect, if the at least two types of signals include at least one uplink signal and at least one downlink signal, the transceiver unit is configured to: send the at least one downlink signal based on the spatial parameter information, where a length of the target time period is determined based on a quantity of time units of the target time period and a minimum value of an SCS of the at least one downlink signal; and receive the at least one uplink signal based on the spatial parameter information, where the length of the target time period is determined based on the quantity of time units of the target time period and a minimum value of an SCS of the at least one uplink signal.

In a possible design of the seventh aspect or the eighth aspect, if the at least two types of signals include a first signal, the transceiver unit is configured to send or receive the first signal based on the spatial parameter information, where a length of the target time period is determined based on a quantity of time units of the target time period and an SCS of the first signal.

In a possible design of the seventh aspect or the eighth aspect, if the at least two types of signals include a first signal, the transceiver unit is configured to send and/or receive the at least two types of signals based on the spatial parameter information, where a length of the target time period is determined based on a quantity of time units of the target time period and an SCS of the first signal.

In a possible design of the seventh aspect or the eighth aspect, any one of the at least two types of signals is indicated by using RRC signaling or MAC CE signaling, or is predefined.

In a possible design of the seventh aspect or the eighth aspect, when the first indication information indicates a plurality of pieces of spatial parameter information, at least one of the at least two types of signals corresponds to a first piece of spatial parameter information in the plurality of pieces of spatial parameter information.

In a possible design of the seventh aspect or the eighth aspect, when the at least two types of signals include the uplink signal, spatial parameter information of the uplink signal is type D quasi-colocation QCL information.

In a possible design of the seventh aspect or the eighth aspect, the transceiver unit is further configured to send second indication information, where the second indication information indicates to send the first indication information.

According to a ninth aspect, embodiments of this application further provide a communication apparatus. The communication apparatus may be a terminal device or a chip. The communication apparatus includes a processor, configured to implement any communication method provided in the first aspect or the second aspect. The communication apparatus may further include a memory, configured to store program instructions and data. The memory may be a memory integrated into the communication apparatus, or an off-chip memory disposed outside the communication apparatus. The memory is coupled to the processor, where the processor may invoke and execute the program instructions stored in the memory, to implement any communication method provided in the first aspect or the second aspect. The communication apparatus may further include a communication interface, and the communication interface is configured to enable the communication apparatus to communicate with another device (e.g., a network device).

According to a tenth aspect, embodiments of this application further provide a communication apparatus. The communication apparatus may be a network device or a chip. The communication apparatus includes a processor, configured to implement any communication method provided in the third aspect or the fourth aspect. The communication apparatus may further include a memory, configured to store program instructions and data. The memory may be a memory integrated into the communication apparatus, or an off-chip memory disposed outside the communication apparatus. The memory is coupled to the processor, where the processor may invoke and execute the program instructions stored in the memory, to implement any communication method provided in the third aspect or the fourth aspect. The communication apparatus may further include a communication interface, and the communication interface is configured to enable the communication apparatus to communicate with another device (e.g., a terminal device).

According to an eleventh aspect, embodiments of this application provide a computer-readable storage medium, including instructions; and when the instructions are run on a computer, the computer is enabled to perform any communication method provided in any one of the first aspect to the fourth aspect.

According to a twelfth aspect, embodiments of this application provide a computer program product including instructions; and when the instructions are run on a computer, the computer is enabled to perform any communication method provided in any one of the first aspect to the fourth aspect.

According to a thirteenth aspect, embodiments of this application provide a chip system. The chip system includes a processor and may further include a memory, to implement any communication method provided in any one of the first aspect to the fourth aspect. The chip system may include a chip; or may include a chip and another discrete device.

According to a fourteenth aspect, embodiments of this application provide a communication system. The system includes the communication apparatuses in the fifth aspect and the seventh aspect, or the system includes the communication apparatuses in the sixth aspect and the eighth aspect.

BRIEF DESCRIPTION OF DRAWINGS

FIG. 3 is a schematic diagram of a format of MAC CE signaling according to an embodiment of this application;

9

Figures 11, 12:
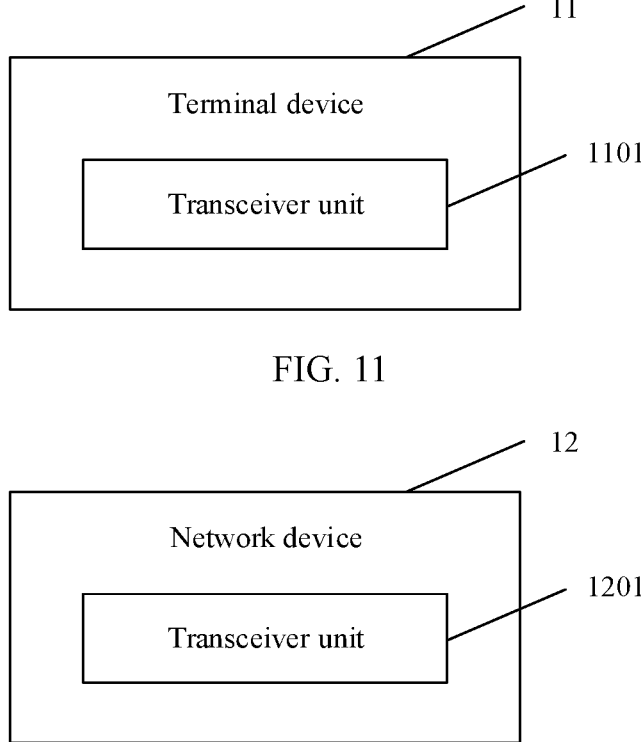
FIG. 11 is a schematic diagram of a structure of another terminal device according to an embodiment of this application.

FIG. 12 is a schematic diagram of a structure of another network device according to an embodiment of this application.

DESCRIPTION OF EMBODIMENTS

To make descriptions of the following embodiments clear and concise, related concepts or technologies are first briefly described.

(1) Spatial parameter information: The spatial parameter information may also be referred to as spatial correlation parameter information or spatial information, and may include quasi-colocation (QCL) information (info) and/or spatial relation information. Generally, the QCL information indicates a spatial correlation parameter (which may also be referred to as a spatial correlation characteristic/spatial characteristic parameter) of a downlink signal, and the spatial relation information indicates a spatial correlation parameter of an uplink signal.

The spatial relation information is used to assist in describing transmit (sending) side beamforming information of a terminal device and a transmit procedure. The spatial relation information may indicate a spatial sending parameter relationship between two reference signals. The two reference signals may include a source reference signal and a target reference signal. The target reference signal is usually a downlink signal, for example, may be a DMRS or an SRS. The referenced reference signal or the source reference signal may include a CSI-RS, an SRS, an SSB, or the like.

The QCL information may also be referred to as QCL assumption information. The QCL information may be used to assist in describing receive side beamforming information of a terminal device and a receive procedure. The QCL information may indicate a QCL relationship between the two reference signals (namely, the source reference signal and the target reference signal). The target reference signal is usually a downlink signal, for example, may be a DMRS or a CSI-RS. The source reference signal may be a CSI-RS (e.g., a tracking reference signal (TRS)) or an SSB.

It should be understood that spatial characteristic parameters of two reference signals (namely, a source reference signal and a target reference signal) that meet a QCL relationship or a spatial relation are the same/close/similar, and a spatial characteristic parameter of the target reference signal can be inferred based on a resource index of the source reference signal. For example, it may be predefined that there is a QCL relationship between an SSB (a source reference signal) determined by the terminal device during initial access and a DMRS (a target reference signal) used to send a PDCCH and a PDSCH. To be specific, a spatial characteristic parameter of the DMRS may be inferred based on a resource index of the SSB.

The spatial characteristic parameter may include one or more of the following parameters: an angle of arrival (AoA), a dominant angle of arrival AoA, an average angle of arrival, a power angular spectrum (PAS) of the angle of arrival, an angle of departure (AoD), a dominant angle of departure, an average angle of departure, a power angular spectrum of the angle of departure, transmission beamforming of the terminal device, reception beamforming of the terminal device, spatial channel correlation, transmission beamforming of a network device, reception beamforming of the network device, an average channel gain, an average channel delay/ average delay, a delay spread, a Doppler spread, a Doppler shift, a spatial Rx parameter, or the like. Any one of the foregoing angles may include decomposition values of different dimensions; or a combination of decomposition values of different dimensions.

The spatial characteristic parameter describes a characteristic of a spatial channel between antenna ports of the source reference signal and the target reference signal, and helps the terminal device complete receive side beamforming or a receive processing process. For example, the terminal device may receive the target reference signal based on reception beam information of the source reference signal indicated by the QCL information. The spatial characteristic parameter further helps the terminal device complete transmit side beamforming or a transmit processing process. For example, the terminal device may transmit the target reference signal based on transmission beam information of the source reference signal indicated by the spatial characteristic parameter.

In an optional implementation, to reduce overheads of indicating the QCL information by the network device to the terminal device, the network device may indicate that the demodulation reference signal of the PDCCH or the PDSCH and one or more of a plurality of reference signals (e.g., CSI-RSs) previously reported by the terminal device meet the QCL relationship. Each reported CSI-RS resource index corresponds to a transmission-reception beam pair established during measurement based on the CSI-RS resource.

In an existing protocol, the QCL relationship may be classified into four types based on different parameters: a type A, a type B, a type C, a type D, and the like.

The type A may include the Doppler shift, the Doppler spread, the average delay, and the delay spread.

The type B may include the Doppler shift and the Doppler spread.

The type C may include the Doppler shift and the average delay.

The type D may include the spatial Rx parameter, and the spatial Rx parameter may be understood as a parameter used to indicate direction information of a reception beam.

The QCL information or type D QCL information in embodiments of this application may include the SRS.

The network device may configure one or more types of QCL information for the terminal device, for example, QCL type A+D or QCL type C+D.

When the QCL relationship is a type D QCL relationship, it may be considered that the QCL relationship is a space domain QCL. When the antenna ports meet the space domain QCL relationship, ports of downlink signals may meet the QCL relationship, or ports of uplink signals may meet the spatial relation. For example, a QCL relationship between a downlink signal and an uplink signal or a spatial relation between ports of the uplink signal and the downlink signal may mean that the two signals have a same AoA or AoD, which indicates that the two signals have a same reception beam or transmission beam. For another example, a QCL relationship between a downlink signal and an uplink signal or a spatial relation between ports of the uplink signal and the downlink signal may mean that a correspondence exists between AoAs and AoDs of the two signals, or a correspondence exists between AoDs and AoAs of the two signals. To be specific, beam reciprocity may be used to determine an uplink transmission beam based on a downlink reception beam, or determine the downlink reception beam based on the uplink transmission beam.

From a perspective of a transmit end, if two antenna ports meet a space domain QCL relationship, it may mean that beam directions corresponding to the two antenna ports are consistent in space. From a perspective of a receive end, if two antenna ports meet a space domain QCL relationship, it may mean that the receive end can receive, in a same beam direction, signals sent on the two antenna ports.

Signals transmitted on ports having a space domain QCL relationship may further have corresponding beams, and the corresponding beams may include one or more of the following: a same reception beam, a same transmission beam, a transmission beam corresponding to a reception beam in a reciprocity scenario, and a reception beam corresponding to a transmission beam in a reciprocity scenario.

The signals transmitted on the ports having the space domain QCL relationship may alternatively be understood as signals sent or received by using a same spatial filter. The spatial filter may include one or more of the following: precoding, a weight of an antenna port, phase deflection of the antenna port, or an amplitude gain of the antenna port.

The signals transmitted on the ports having the space domain QCL relationship may alternatively be understood as signals having a corresponding beam pair link (BPL), and the corresponding BPL includes one or more of the following: a same downlink BPL, a same uplink BPL, an uplink BPL corresponding to a downlink BPL, or a downlink BPL corresponding to an uplink BPL.

(2) Transmission configuration indicator state (TCI-state): The TCI-state may also be referred to as TCI information, is configured by a network device for each terminal device, and indicates QCL information of a signal/channel. The channel, may be, for example, a PDCCH, a CORESET, or a PDSCH. The signal, may be, for example, a CSI-RS, a DMRS, or a TRS.

One or more source reference signals and an associated QCL type may be configured for one TCI-state. In other words, configuration information of the TCI-state may include identifiers of one or two reference signals (source reference signals) and the associated QCL type. The TCI-state may indicate that the source reference signal included in the TCI-state and a target reference signal meet a QCL relationship, that is, information such as a spatial characteristic parameter of the target reference signal is the same as, similar, or close to information such as a spatial characteristic parameter of the source reference signal included in the TCI. In this way, the terminal device may receive the target reference signal based on the spatial characteristic parameter of the source reference signal.

The following is a possible format of the TCI-state:

```
TCI-State ::=               SEQUENCE {
    tci-StateId                 TCI-StateId,
    qcl-Type1                   QCI-Info,
    qcl-Type2                   QCI-Info
    OPTIONAL,                   -- Need R
    ...
}
QCI-Info ::=                SEQUENCE {
    cell                        ServCellIndex
    OPTIONAL,                   -- Need R
    bwp-Id                      BWP-Id
    OPTIONAL,                   -- Need R
    referenceSignal             CHOICE {
        csi-rs                      NZP-CSI-RS-ResourceSetId
        ssb                         SSB-Index
    }
    qcl-Type                    ENUMERATED {typeA,TypeB,TypeC,TypeD},
    ...
}
```

In addition, the TCI-state may be globally configured. In TCI-states configured for different cells or different bandwidth parts (BWPs), if indexes of the TCI-states are the same, configurations of the TCI-states are also the same.

(3) An antenna port (antenna port) may be referred to as a port for short. One antenna port may be configured for each virtual antenna, each virtual antenna may include a weighted combination of a plurality of physical antennas, and each antenna port may correspond to one reference signal port.

Antenna ports may be antenna ports having different antenna port numbers. Alternatively, the antenna ports may be antenna ports that have a same antenna port number or different antenna port numbers and that send or receive information at different time points. Alternatively, the antenna ports may be antenna ports that have a same antenna port number or different antenna port numbers and that send or receive information at different frequencies. Alternatively, the antenna ports may be antenna ports that have a same antenna port number or different antenna port numbers and that send or receive information in different code domain resources.

Signals corresponding to antenna ports having a QCL relationship may have a same spatial characteristic parameter or similar spatial characteristic parameters (where the spatial characteristic parameter is alternatively referred to as a parameter); a spatial characteristic parameter of an antenna port may be used to determine a spatial characteristic parameter of another antenna port having a QCL relationship with the antenna port; two antenna ports having a QCL relationship have a same spatial characteristic parameter or similar spatial characteristic parameters; or a difference between spatial characteristic parameters of two antenna ports having a QCL relationship is less than a specific threshold.

(4) A component carrier (CC) may also be referred to as a component carrier, a component carrier, a component carrier, or the like. Each carrier in multi-carrier aggregation may be referred to as a "CC". A terminal device may receive data on a plurality of CCs. Each carrier includes one or more physical resource blocks (PRBs), and each carrier may have a corresponding PDCCH for scheduling a PDSCH of each CC, or some carriers have no PDCCH, and in this case, cross-carrier scheduling (cross-carrier scheduling) may be performed on these carriers.

The cross-carrier scheduling means that a network device schedules data transmission on another CC by sending a PDCCH on one CC (that is, transmitting a PDSCH on the another CC, or transmitting a PUSCH on the another CC). For example, the network device may send a PDCCH in a BWP on one CC to schedule transmission of a PDSCH or a PUSCH in a BWP on another CC. That is, a control channel is transmitted on one CC, and a corresponding data channel is transmitted on another CC.

(5) BWP: Because different terminal devices in a same cell in NR may have different transmit or receive capabilities, a system may configure a corresponding bandwidth for each terminal device. The part of bandwidth configured for the terminal device is referred to as a BWP, and the terminal device performs transmission in the BWP corresponding to the terminal device. The BWP may be a group of consecutive frequency domain resources on a carrier, for example, a physical resource block (PRB). A minimum granularity of the BWP in frequency domain may be one PRB. Frequency domain resources occupied by different BWPs may partially overlap, or may not overlap with each other. The frequency domain resources occupied by the different BWPs may have a same bandwidth or different bandwidths. This is not limited in this application.

In a single-carrier scenario, one terminal device may have only one active BWP at a same moment, and the terminal device receives data/a reference signal or sends data/a reference signal only in the active BWP.

When embodiments of this application are applicable to a BWP scenario, the BWP may alternatively be a bandwidth set at a specific frequency, a set including a plurality of resource blocks (RBs), or the like. This is not limited in this application.

(6) A control resource set (CORESET) is a resource set used to transmit downlink control information, and may also be referred to as a control resource region or a physical downlink control channel resource set.

A network device may configure one or more control resource sets for a terminal device, to send a physical downlink control channel. The network device may send, to the terminal device, a control channel on any control resource set corresponding to the terminal device. In addition, the network device further needs to notify the terminal device of another configuration associated with the control resource set, for example, a search space set. Configuration information of each control resource set is different, for example, a frequency domain width difference and/or a time domain length difference.

Optionally, the control resource set in this application may be any one of a CORESET, a control region, or an enhanced physical downlink control channel (ePDCCH) set defined in a future 5th generation (5G) mobile communication system.

A time-frequency position occupied by a PDCCH may be referred to as a downlink control region. In a possible case, the PDCCH is always located in the first m symbols of a subframe, where a possible value of m is 1, 2, 3, or 4. In another possible case, the PDCCH may be located in any one or more symbols of a subframe. The downlink control region may be flexibly configured by using RRC signaling using a CORESET and a search space set (search space set). In the CORESET, information such as a frequency domain position of the PDCCH or a control channel element (CCE), and a quantity of continuous symbols in time domain may be configured. In the search space set, information such as a monitoring periodicity of the PDCCH, an offset of the PDCCH, and a start symbol of the PDCCH in a slot may be configured. For example, if it may be configured in the search space set that a PDCCH periodicity is one slot and a start symbol in time domain is a symbol 0, the terminal device may detect the PDCCH at a start position of each slot.

(7) Reference signal: A communication system usually includes two types of reference signals. One type of reference signal is used for channel estimation, so that coherent demodulation can be performed on a received signal including control information or data. The other type of reference signal is used to measure a channel state or channel quality, to schedule a terminal device. For example, the terminal device may obtain channel state information CSI by measuring channel quality of a CSI-RS. The CSI includes at least one of a rank indicator (RI), a precoding matrix indicator (PMI), a channel quality indicator (CQI), or the like. The CSI information may be sent by the terminal device to a network device by using a physical uplink control channel or a physical uplink shared channel.

(8) Beam: The beam may include a wide beam, a narrow beam, or a beam of another type. Different beams may be considered as different communication resources. Same information or different information may be sent by using different beams. Optionally, a plurality of beams having a same communication feature or similar communication features may be considered as one beam. One beam corresponds to one or more antenna ports, and is used to transmit a data channel, a control channel, a sounding signal, or the like. The one or more antenna ports corresponding to the beam may also be considered as one antenna port set.

Optionally, the beam may also be referred to as or equivalent to a spatial filter (spatial filter or spatial domain filter), a spatial transmission filter or a spatial domain transmission filter. A beam used to send a signal may be referred to as a transmission beam (Tx beam), or referred to as a spatial domain transmission filter or a spatial transmission parameter. A beam used to receive a signal may be referred to as a reception beam (Rx beam), or may be referred to as a spatial domain receive filter or a spatial RX parameter. The transmission beam may refer to distribution of signal strength formed in different directions in space after a signal is transmitted through an antenna, and the reception beam may refer to distribution of signal strength, in different directions in space, of a radio signal received from an antenna. A reception beam on a terminal device side and a transmission beam on a network device side each may be a downlink spatial filter, and a transmission beam on the terminal device side and a reception beam on the network device side each may be an uplink spatial filter.

The beam may include a transmission beam and a reception beam of the network device and a transmission beam and a reception beam of the terminal device. The transmission beam of the network device is used to describe transmit side beamforming information of the network device, and the reception beam of the network device is used to describe receive side beamforming information of the network device. The transmission beam of the terminal device is used to describe transmit side beamforming information of the terminal device, and the reception beam of the terminal device is used to describe receive side beamforming information of the terminal device. To be specific, the beam may be used to describe beamforming information. In addition, the term "beam" is not used in a standard. The transmission beam of the network device may be represented by using a reference signal resource. For example, a beam index 1 may be described as a reference signal resource index 1 in the standard. The reception beam of the terminal device may be indicated by using a spatial Rx parameter in QCL. In the standard, beam status information may be described as L1-RSRP related information or L1-SINR related information.

Optionally, the beam may correspond to a resource. For example, the beam may correspond to a time resource, a space resource, or a frequency domain resource. Optionally, the beam may alternatively correspond to a reference signal resource (e.g., a beamformed reference signal resource) or beamforming information. Optionally, the beam may alternatively correspond to information associated with a reference signal resource of the network device. The reference signal may include, for example, a CSI-RS, an SSB, a DMRS, a PTRS, or a TRS. The information associated with the reference signal resource may be a reference signal resource identifier, QCL information (e.g., type D QCL), or the like. The reference signal resource identifier corresponds to a transmission-reception beam pair previously established during measurement based on the reference signal resource. The terminal device may infer beam information of a target reference signal by using a reference signal (a source reference signal) resource index.

(9) Beamforming: A technology for forming a beam may be referred to as a beamforming technology. The beamforming technology may include a digital beamforming technology, an analog beamforming technology, and a hybrid digital/analog beamforming technology. A beamformed signal may include a broadcast signal, a synchronization signal, a channel state information-reference signal, and the like. When a signal is transmitted based on the beamforming technology, once a terminal device moves, a direction of a formed beam corresponding to the transmitted signal may no longer match a location of the moved terminal device, resulting in frequent signal reception interruption. To track a formed beam change in a signal transmission process, a channel quality measurement and result reporting process based on the beamforming technology may be introduced. The channel quality measurement may be based on a synchronization signal or a channel state information-reference signal obtained after beamforming. Compared with a cell handover, a user performs a handover between different formed beams more dynamically and frequently. Therefore, a dynamic measurement reporting mechanism is required. For example, user equipment may report a channel quality result of a formed beam reference signal to a network device by using a physical uplink control channel or a physical uplink shared channel.

(10) Beam training: The beam training may be a process in which a terminal device (e.g., user equipment (UE)) measures a plurality of beams from a network device (e.g., a base station), selects N better beams, and reports measurement information of the N better beams to the base station. Measurement information of a beam mainly includes at least one of a reference signal resource index, reference signal received power (RSRP), and a signal to interference plus noise ratio (SINR) of a reference signal.

Figure 1:
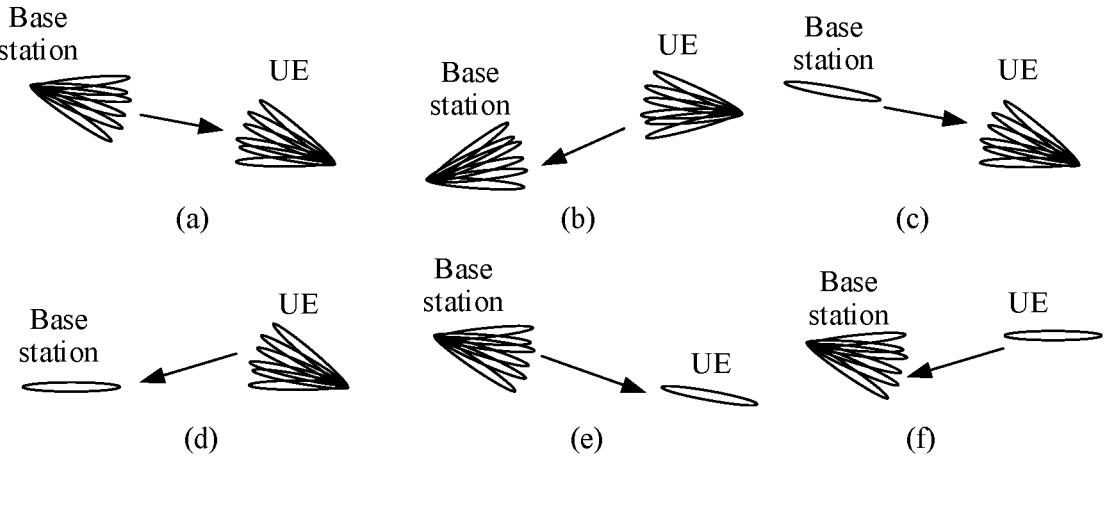
FIG. 1 is a schematic diagram of beam training according to an embodiment of this application.

As shown in FIG. 1, a beam training process may include the following processes:

(1) Selection of N optimal BPLs (where one BPL may include a transmission beam of a base station and a reception beam of a terminal, or one BPL includes a transmission beam of the terminal and a reception beam of the base station). As shown in (a) and (b) in FIG. 1, UE may select the transmission beam of the base station and/or the reception beam of the terminal based on beam sweeping of the base station, and the base station selects the transmission beam of the terminal and/or the reception beam of the base station based on beam sweeping of the UE.

(2) Update of the transmission beam. The transmission beam may be the transmission beam of the base station, or may be the transmission beam of the terminal. When the transmission beam is the transmission beam of the base station, as shown in (e) in FIG. 1, the base station sends a reference signal to the UE by using different transmission beams. The UE receives, by using a same reception beam, the reference signal from the base station by using the different transmission beams, determines an optimal transmission beam of the base station based on a received signal, and then feeds back the optimal transmission beam of the base station to the base station, so that the base station updates the transmission beam. When the transmission beam is the transmission beam of the terminal, as shown in (d) in FIG. 1, the UE sends a plurality of beams, and the base station measures the plurality of beams from the UE, and notifies the UE of a better beam in the plurality of beams from the UE. The UE sends a reference signal to the base station by using different transmission beams. The base station receives, by using a same reception beam, the reference signal from the UE by using the different transmission beams, determines an optimal transmission beam of the UE based on a received signal, and then feeds back the optimal transmission beam of the UE to the UE, so that the UE updates the transmission beam. The process of sending the reference signal by using the different transmission beams may be referred to as beam sweeping, and the process of determining the optimal transmission beam based on the received signal may be referred to as beam matching.

(3) Update of the reception beam. The reception beam may be the reception beam of the base station, or may be the reception beam of the terminal. When the reception beam is the reception beam of the base station, as shown in (f) in FIG. 1, the UE sends a reference signal to the base station by using a same transmission beam. The base station receives, by using different reception beams, the reference signal from the UE, and then determines an optimal reception beam of the base station based on a received signal, to update the reception beam of the base station. When the reception beam is the reception beam of the UE, as shown in (c) in FIG. 1, the base station sends a reference signal to the UE by using a same transmission beam. The UE receives, by using different reception beams, the reference signal from the base station, and then determines an optimal reception beam of the UE based on a received signal, to update the reception beam of the UE.

(11) Beam indication: During signal transmission, for example, in a downlink signal transmission process, both a transmission beam of a base station and a reception beam of a terminal may dynamically change, and there may be a plurality of optimal reception beams determined by the terminal device based on a received signal. To enable the terminal device to determine a reception beam of the terminal device, the terminal device may feed back information about the plurality of reception beams to a network device, and the network device may indicate the reception beam of the terminal to the terminal device by sending beam indication information to the terminal device. For example, when the terminal device uses analog domain beamforming, the terminal device may accurately determine the reception beam of the terminal based on the beam indication information from the network device, so that beam sweeping duration of the terminal device can be reduced, to achieve a power saving effect.

Figure 2:
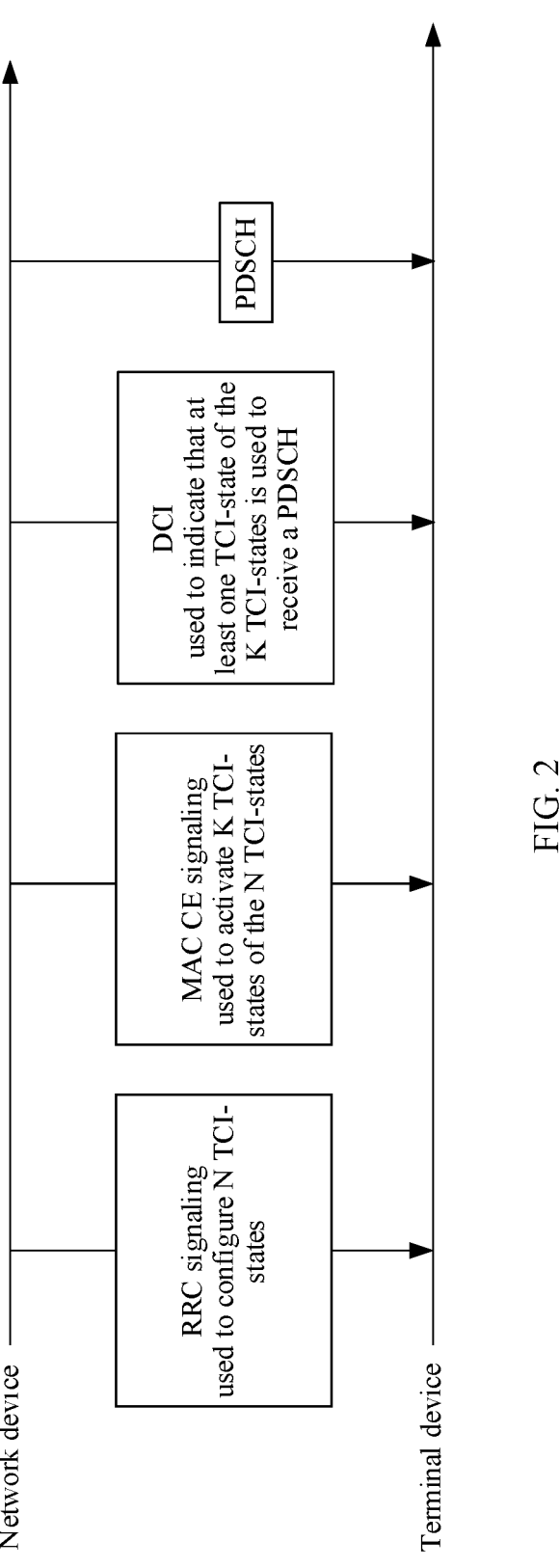
FIG. 2 is a signaling flowchart of indicating beam information of a PDSCH according to an embodiment of this application.

Currently, beam indication methods for a PDSCH, a PDCCH, a CSI-RS, a PUCCH, an SRS, and a PUSCH are specifically as follows:

(1) As shown in FIG. 2, a network device may indicate beam information (or referred to as QCL information) of a PDSCH to a terminal device by using signaling such as RRC, a MAC CE, and DCI.

First, the network device may configure N TCI-states for the PDSCH by using an indication field of the RRC. For example, the indication field of the RRC may be PDSCH-Config, and a format of PDSCH-Config may be shown as follows:

| | |
|---|---|
| PDSCH-Config ::= | SEQUENCE { |
|     dataScramblingIdentity PDSCH | INTEGER (0..1023) |
| OPTIONAL, | |
|       dmrs-DownlinkForPDSCH-MappingTypeA | SetupRelease { DMRS- |
| DownlinkConfig } | OPTIONAL, -- Need M |
|       dmrs-DownlinkForPDSCH-MappingTypeB | SetupRelease { DMRS- |
| DownlinkConfig } | OPTIONAL, -- Need M |
|     tci-StatesToAddModList | SEQUENCE |
| (SIZE(1..maxNrofTCI-States)) OF TCI-State | OPTIONAL, |
|     -- NeedN | |
|     tci-StatesToReleaseList | SEQUENCE |
| (SIZE(1..maxNrofTCI-States)) OF TCI-StateId | OPTIONAL, |
|     -- NeedN | |

Then, the network device may activate K TCI-states of the N TCI-states by using the MAC CE, and the K TCI-states are a subset of the N TCI-states. For example, a format of the MAC CE in a protocol may be shown in FIG. 3, and fields of the MAC CE are described as follows:

Serving cell (serving cell) identity (identity, ID): This field indicates an ID of a serving cell to which the TCI-state indicated by the MAC CE belongs.

BWP ID: This field includes a BWP ID, and the BWP ID indicates a downlink bandwidth part in which the MAC CE is used.

Ti: This field indicates an activated/a deactivated state of a TCI-state with a TCI-StateID i. When the Ti field is set to 1, it indicates that the TCI-state with the TCI-StateID i is activated, and is mapped to a TCI field (TCI field) in the DCI. When the Ti field is set to "0", it indicates that the TCI-state with the TCI-StateID i is deactivated and is not mapped to the TCI field in the DCI. Whether there is the TCI field in the DCI may be indicated by using higher layer signaling (RRC TCI-Present InDCI).

R: Ibis is a reserved field (reserved field).

During mapping from TCI-states to codepoints of the DCI, all TCI-states whose Ti fields are set to "1" are mapped to the codepoints in sequence. For example, a first TCI-state whose Ti field is set to "1" is mapped to a codepoint value 0, and a second TCI-state whose Ti field is set to "1" is mapped to a codepoint value 1. A maximum quantity of activated TCI-states may be 8. In addition, in a multi-transmission reception point (TRP) transmission scenario, the MAC CE may also map a maximum of two TCI-states to one codepoint in the TCI field in the DCI.

In a possible design, the network device may simultaneously update TCI-StateIDs of PDSCHs on a plurality of CCs or in a plurality of BWPs by using one MAC CE.

Then, the network device may indicate, by using the TCI field (which may also be referred to as the TCI field for short) in the DCI, that at least one TCI-state of the K TCI-states is used to receive the PDSCH, where the TCI field may include X bits (bits), and X is an integer greater than or equal to 1. For example, in the protocol, when X=3, different values of the TCI field may separately indicate one TCI-state in Table 1.

TABLE 1

| Values of one TCI field | TCI-state |
|---|---|
| 000 | TCI-StateID a1 |
| 001 | TCI-StateID a2 |
| 010 | TCI-StateID a3 |
| 011 | TCI-StateID a4 |
| 100 | TCI-StateID a5 |
| 101 | TCI-StateID a6 |
| 110 | TCI-StateID a7 |
| 111 | TCI-StateID a8 |

In a possible design, beam information (or referred to as QCL information) of a PDSCH may alternatively be indicated by using two levels of signaling such as RRC and DCI. To be specific, a TCI field in the DCI may indicate that at least one TCI-state of N TCI-states is used to receive the PDSCH.

Figure 4:
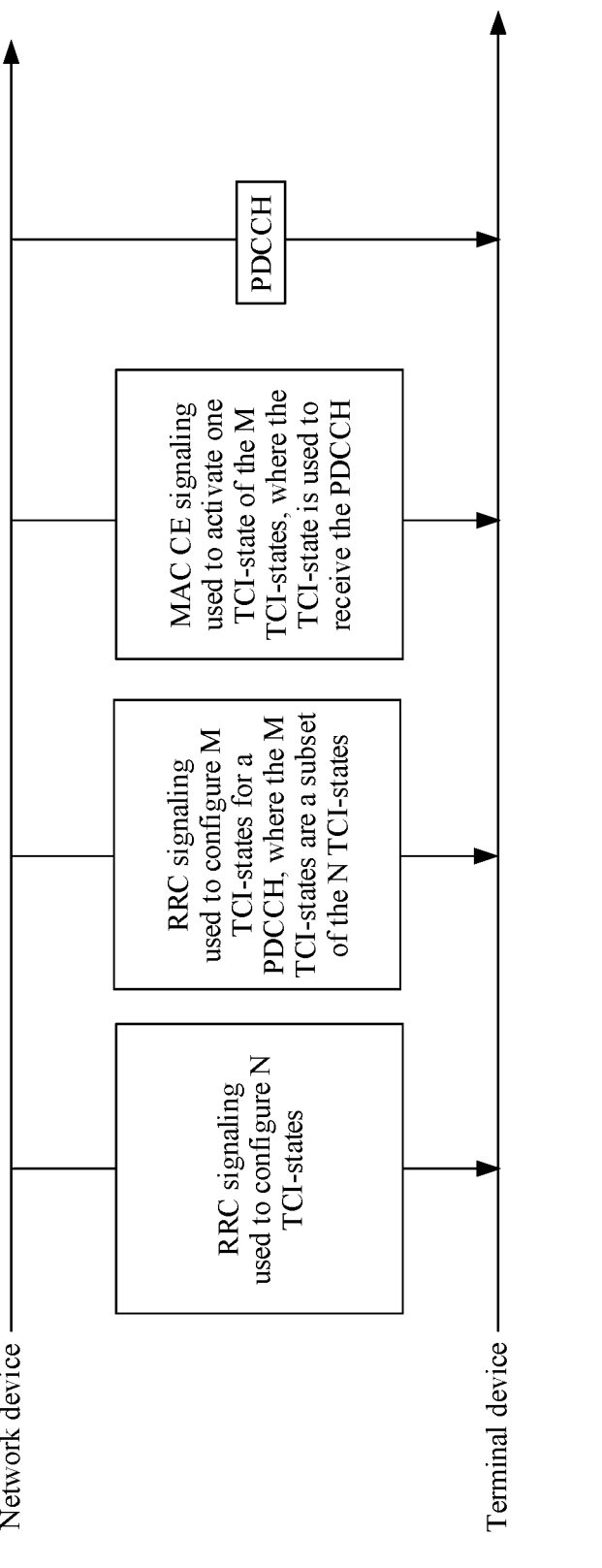
FIG. 4 is a signaling flowchart of indicating beam information of a PDCCH according to an embodiment of this application.

(2) As shown in FIG. 4, the network device may indicate beam information (or referred to as QCL information) of a PDCCH to the terminal device by using two levels of signaling such as RRC and a MAC CE. Specifically, M TCI-states may be configured for the PDCCH by using the RRC, and the M TCI-states are a subset of the N TCI-states of the PDSCH. Then, one TCI-state of the M TCI-states may be activated by using the MAC CE, and the TCI-state is used to receive the PDCCH. In a possible design, TCI-states with a same CORESET ID on a plurality of CCs or in a plurality of BWPs may be simultaneously updated by using one MAC CE.

In a possible design, the beam information of the PDCCH may be indicated only by using the RRC signaling. To be specific, one TCI-state of the M TCI-states is activated by using the RRC signaling, and the TCI-state is used to receive the PDCCH.

(3) Beam information (or referred to as QCL information) of a CSI-RS may be indicated by using RRC. To be specific, one TCI-state may be configured for the CSI-RS by using the RRC. The TCI-state is one of the N TCI-states of the PDSCH.

(4) Beam information (or referred to as spatial relation information) of a PUCCH may be indicated by using two levels of signaling such as RRC and a MAC CE. N spatial relations may be configured for the PUCCH by using the RRC, then one spatial relation of the N spatial relations is activated by using the MAC CE, and the spatial relation is used to send the PUCCH. In addition, one MAC CE may simultaneously update a spatial relation of one PUCCH resource group. Alternatively, the beam information of the PUCCH may be indicated only by using RRC signaling. To be specific, one spatial relation of the N spatial relations is activated by using the RRC signaling, and the spatial relation is used to send the PUCCH.

(5) Beam information (or referred to as spatial relation information) of an SRS may be indicated by using two levels of signaling such as RRC and a MAC CE, may be indicated only by using the RRC signaling, or may be indicated only by using the MAC CE signaling. The SRS may be classified into a periodic SRS, a semi-periodic SRS, and an aperiodic SRS. For the periodic SRS, one spatial relation may be configured by using the RRC. For the semi-periodic SRS, one spatial relation may be configured by using the RRC, or one spatial relation may be indicated by using the MAC CE. For the aperiodic SRS, one spatial relation may be configured by using the RRC, or one spatial relation may be indicated by using the MAC CE. In addition, a spatial relation having a same SRS resource ID (the semi-periodic/aperiodic SRS) on a plurality of CCs or in a plurality of BWPs may be simultaneously updated by using one MAC CE.

(6) Beam information (or referred to as spatial relation information) of a PUSCH may be indicated by using an SRI field in DCI. The spatial relation information of the PUSCH is the same as spatial relation information of an SRS indicated by the SRI field.

In conclusion, in a scenario in which a terminal device moves, a network device needs to separately update beam information of different signals/channels by using a plurality of pieces of signaling and a plurality of levels of signaling. Consequently, signaling overheads are high, and an update speed is slow.

According to a communication method provided in embodiments of this application, spatial parameter information (beam information) of a plurality of types of channels/signals may be simultaneously updated by using one piece of signaling, so that a terminal device can quickly complete a beam handover, to avoid link interruption and reduce signaling overheads.

The technical solutions in embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a 5G mobile communication system, a new radio (new radio, NR) system, or the like. The 5G mobile communication system in this application includes a non-standalone (NSA) 5G mobile communication system and/or a standalone (SA) 5G mobile communication system. The technical solutions provided in this application may be further applied to a future communication system, for example, a 6th generation mobile communication system. Alternatively, the communication system may be a future evolved public land mobile network (PLMN), a device-to-device (D2D) network, a machine-to-machine (M2M) network, an internet of things (IoT) network, or another network.

Figure 5:
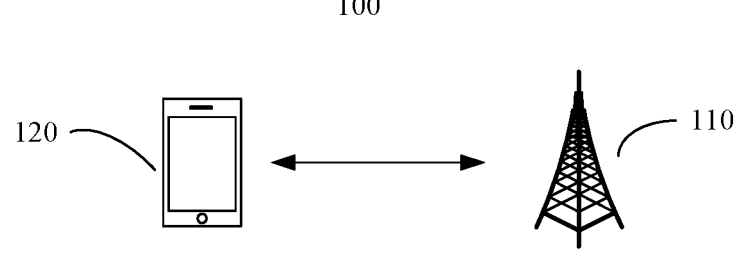
FIG. 5 is a schematic diagram of an architecture of a communication system according to an embodiment of this application.

FIG. 5 shows a communication system 100 to which this application is applicable. The communication system 100 is in a single carrier scenario or a carrier aggregation (CA) scenario. The communication system 100 includes a network device 110 and a terminal device 120. The network device 110 communicates with the terminal device 120 by using a wireless network. It should be understood that the network device 110 in FIG. 5 may include one or more cells. When a transmit direction of the communication system 100 is uplink transmission, the terminal device 120 is a transmit end, and the network device 110 is a receive end. When the transmit direction of the communication system 100 is downlink transmission, the network device 110 is a transmit end, and the terminal device 120 is a receive end.

Figure 6:
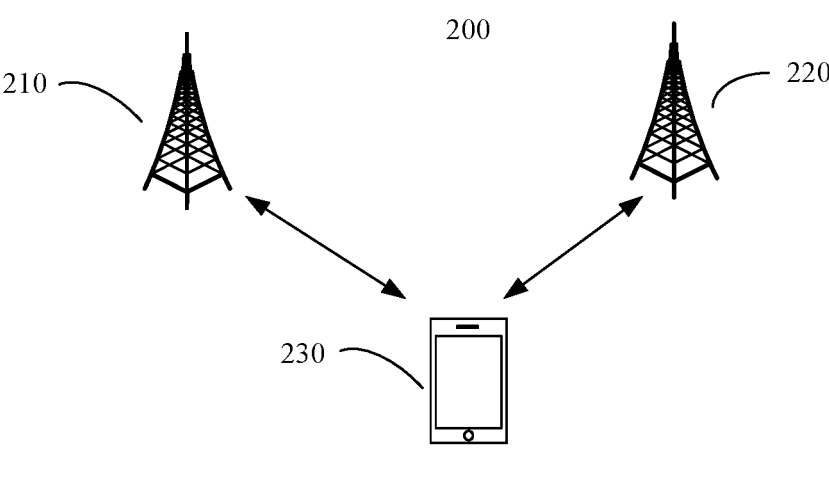
FIG. 6 is a schematic diagram of an architecture of another communication system according to an embodiment of this application.

FIG. 6 shows another communication system 200 to which this application is applicable. The communication system 200 is in a dual connectivity (DC) or coordinated multipoint transmission/reception (CoMP) scenario. The communication system 200 includes a network device 210, a network device 220, and a terminal device 230. The network device 210 is a network device during initial access of the terminal device 230, and is responsible for RRC communication with the terminal device 230. The network device 220 is added during RRC reconfiguration, and is configured to provide an additional radio resource. The terminal device 230 on which CA is configured is connected to the network device 210 and the network device 220. A link between the network device 210 and the terminal device 230 may be referred to as a first link, and a link between the network device 220 and the terminal device 230 may be referred to as a second link.

The foregoing communication systems to which this application is applicable are merely examples for description, and a communication system to which this application is applicable is not limited thereto. For example, the communication system may include another quantity of network devices and another quantity of terminal devices.

It should be understood that the technical solutions in embodiments of this application may be applied to a beam indication in a single carrier or CA scenario, or a beam indication in a DC scenario.

It should be understood that the technical solutions in embodiments of this application may be applicable to a case in which a primary cell/primary serving cell (PCell) is at a high frequency or a low frequency, and a secondary cell/secondary serving cell (SCell) is at a high frequency or a low frequency. For example, when the PCell is at a low frequency, the SCell is at a high frequency. Usually, the low frequency and the high frequency are relative to each other, or may be differentiated based on a specific frequency, for example, 6 GHz.

It should be understood that the technical solutions in embodiments of this application may be further applied to a beam indication in a coordinated multipoint transmission/reception (CoMP) scenario. The CoMP may be one or more scenarios of non-coherent joint transmission (NCJT), coherent joint transmission (CJT), or joint transmission (JT).

The terminal device in embodiments of this application may be user equipment, an access terminal, a subscriber unit, a subscriber station, a mobile station, a remote station, a remote terminal, a mobile device, a user terminal, a terminal, a wireless communication device, a user agent, or a user apparatus. Alternatively, the terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a PLMN, or the like. This is not limited in embodiments of this application.

As an example instead of a limitation, in embodiments of this application, the terminal device may alternatively be a wearable device. The wearable device may also be referred to as a wearable intelligent device, and is a general term of a wearable device that is intelligently designed and developed for daily wear by using a wearable technology, for example, glasses, gloves, a watch, clothing, and shoes. The wearable device is a portable device that can be directly worn by a user or integrated into clothes or an accessory of a user. The wearable device is more than a hardware device. The wearable device implements powerful functions through software support, data exchange, and cloud interaction. In a broad sense, a wearable intelligent device includes a full-featured and large-sized device that can implement complete or partial functions without depending on a smartphone, such as a smart watch or smart glasses, and a device that focuses on only one type of application function and needs to work with another device such as smartphones, such as various smart bands or smart jewelry for monitoring physical signs.

In addition, the terminal device in embodiments of this application may alternatively be a terminal device in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrow band (NB) technology.

In addition, in embodiments of this application, the terminal device may further include a sensor such as an intelligent printer, a train detector, or a gas station. Main functions of the terminal device include collecting data (for some terminal devices), receiving control information and downlink data from a network device, sending an electromagnetic wave, and transmitting uplink data to the network device.

The network device in embodiments of this application may be a device configured to communicate with the terminal device. The network device may be a base transceiver station (BTS) in a GSM system or a CDMA system, may be a NodeB (NB) in a WCDMA system, may be an evolved NodeB (eNB or eNodeB) in an LTE system, or may be a radio controller in a cloud radio access network (CRAN) scenario. Alternatively, the network device may be a relay station, an access point, a vehicle-mounted device, a wearable device, a network device in a future 5G network, a network device in a future evolved PLMN network, or the like. This is not limited in embodiments of this application.

The network device in embodiments of this application may be a device in a wireless network, for example, a radio access network (RAN) node that connects a terminal to the wireless network. Currently, some RAN nodes are, for example, a base station, a next-generation NodeB gNB, a TRP, an evolved NodeB (eNB), a home NodeB, a baseband unit (BBU), or an access point (AP) in a Wi-Fi system. In a network structure, the network device may include a centralized unit (CU) node, a distributed unit (DU) node, or a RAN device including a CU node and a DU node.

The terminal device or the network device in FIG. 5 or FIG. 6 in embodiments of this application may be implemented by using one device, or may be a functional module in a device. This is not specifically limited in embodiments of this application. It may be understood that the foregoing function may be a network element in a hardware device, a software function running on dedicated hardware, a virtualized function instantiated on a platform (e.g., a cloud platform), or a chip system. In embodiments of this application, the chip system may include a chip; or may include a chip and another discrete component.

Figures 7, 8:
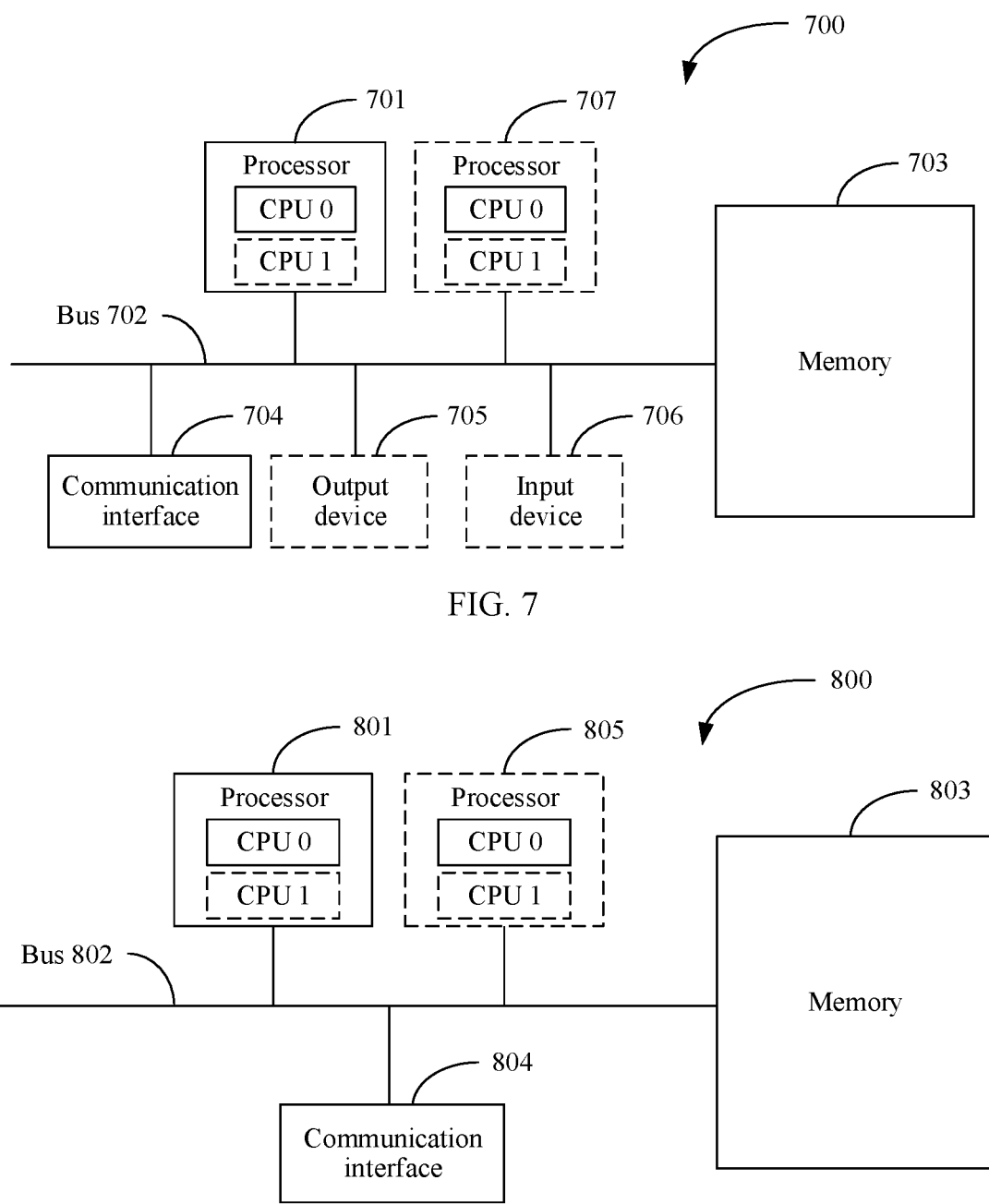
FIG. 7 is a schematic diagram of a structure of a terminal device according to an embodiment of this application.
FIG. 8 is a schematic diagram of a structure of a network device according to an embodiment of this application.

For example, an apparatus configured to implement functions of the terminal device provided in embodiments of this application may be implemented by using an apparatus 700 in FIG. 7. FIG. 7 is a schematic diagram of a structure of hardware of the apparatus 700 according to an embodiment of this application. The apparatus 700 includes at least one processor 701, configured to implement functions of the terminal device provided in embodiments of this application. The apparatus 700 may further include a bus 702 and at least one communication interface 704. The apparatus 700 may further include a memory 703.

In this embodiment of this application, the processor may be a central processing unit (CPU), a general-purpose processor, a network processor (NP), a digital signal processor (DSP), a microprocessor, a micro controller unit, or a programmable logic device (PLD). The processor may alternatively be any other apparatus having a processing function, for example, an application-specific integrated circuit (ASIC), a field programmable gate array (FPGA) or another programmable logic device, a transistor logic device, a hardware component, a software module, or any combination thereof.

The bus 702 may be configured to transmit information between the foregoing components.

The communication interface 704 is configured to communicate with another device or communication network such as the Ethernet, a radio access network (RAN), or a wireless local area network (WLAN). The communication interface 704 may be an interface, a circuit, a transceiver, or another apparatus that can implement communication. This is not limited in this application. The communication interface 704 may be coupled to the processor 701. The coupling in this embodiment of this application is indirect coupling or a communication connection between apparatuses, units, or modules for information exchange between the apparatuses, the units, or the modules, and may be in electrical, mechanical, or other forms.

In this embodiment of this application, the memory may be a read-only memory (ROM), another type of static storage device that can store static information and instructions, a random access memory (RAM), another type of dynamic storage device that can store information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium, another magnetic storage device, or any other medium that can be used to carry or store expected program code in a form of instructions or a data structure and that can be accessed by a computer. However, the memory is not limited thereto. The memory may exist independently, or may be coupled to the processor, for example, by using the bus 702. Alternatively, the memory may be integrated with the processor.

The memory 703 is configured to store program instructions, and the program instructions may be executed under control of the processor 701, to implement a communication method provided in the following embodiment of this application. The processor 701 is configured to invoke and execute the instructions stored in the memory 703, to implement the communication method provided in the following embodiment of this application.

Optionally, computer-executable instructions in embodiments of this application may also be referred to as application program code. This is not specifically limited in embodiments of this application.

Optionally, the memory 703 may be included in the processor 701.

During specific implementation, in an embodiment, the processor 701 may include one or more CPUs, for example, a CPU 0 and a CPU 1 in FIG. 7.

During specific implementation, in an embodiment, the apparatus 700 may include a plurality of processors, for example, the processor 701 and a processor 707 in FIG. 7. Each of the processors may be a single-CPU processor or a multi-CPU processor. Herein, the processor may be one or more devices, circuits, and/or processing cores configured to process data (e.g., computer program instructions).

During specific implementation, in an embodiment, the apparatus 700 may further include an output device 705 and an input device 706. The output device 705 is coupled to the processor 701, and may display information in a plurality of manners. For example, the output device 705 may be a liquid crystal display (LCD), a light emitting diode (LED) display device, a cathode ray tube (cathCRT) display device, a projector (projector), or the like. The input device 706 is coupled to the processor 701, and may receive input of a user in a plurality of manners. For example, the input device 706 may be a touchscreen device or a sensing device.

The apparatus 700 may be a general-purpose device or may be a dedicated device. During specific implementation, the apparatus 700 may be a vehicle-mounted terminal, a transportation device with a built-in computer (processor), or a device having a structure similar to that in FIG. 7. A type of the apparatus 700 is not limited in this embodiment of this application.

For example, an apparatus configured to implement functions of the network device provided in embodiments of this application may be implemented by using an apparatus 800 in FIG. 8. FIG. 8 is a schematic diagram of a structure of hardware of the apparatus 800 according to an embodiment of this application. The apparatus 800 includes at least one processor 801, configured to implement functions of the network device provided in embodiments of this application. The apparatus 800 may further include a bus 802 and at least one communication interface 804. The apparatus 800 may further include a memory 803.

The bus 802 may be configured to transmit information between the foregoing components.

The communication interface 804 is configured to communicate with another device or communication network such as the Ethernet, a RAN, or a WLAN. The communication interface 804 may be an interface, a circuit, a transceiver, or another apparatus that can implement communication. This is not limited in this application. The communication interface 804 may be coupled to the processor 801.

The memory 803 is configured to store program instructions, and the program instructions may be executed under control of the processor 801, to implement a communication method provided in the following embodiment of this application. For example, the processor 801 is configured to invoke and execute the instructions stored in the memory 803, to implement the communication method provided in the following embodiment of this application.

Optionally, the memory 803 may be included in the processor 801.

During specific implementation, in an embodiment, the processor 801 may include one or more CPUs, for example, a CPU 0 and a CPU 1 in FIG. 8.

During specific implementation, in an embodiment, the apparatus 800 may include a plurality of processors, for example, the processor 801 and a processor 805 in FIG. 8. Each of these processors may be a single-core processor, or may be a multi-core processor. Herein, the processor may be one or more devices, circuits, and/or processing cores configured to process data (e.g., computer program instructions).

The apparatus 800 may be a general-purpose device or a dedicated device. During specific implementation, the apparatus 800 may be a vehicle-mounted terminal, a transportation device with a built-in computer (processor), or a device having a structure similar to that in FIG. 8. A type of the apparatus 800 is not limited in this embodiment of this application.

In embodiments of this application, the terminal device or the network device includes a hardware layer, an operating system layer running above the hardware layer, and an application layer running above the operating system layer. The hardware layer includes hardware such as a CPU, a memory management unit (MMU), and a memory (also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, a contact list, word processing software, and instant messaging software. In addition, a specific structure of an execution body of the method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal device or the network device, or a functional module that can invoke and execute the program and that is in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, a computer-readable medium may include but is not limited to a magnetic storage device (e.g., a hard disk, a floppy disk, or a magnetic tape), an optical disc (e.g., a CD or a digital versatile disc (DVD)), a smart card and a flash memory device (e.g., an EPROM, a card, a stick, or a key drive). In addition, various storage media described in this specification may represent one or more devices and/or other machine-readable media that are configured to store information. The term "machine-readable media" may include but is not limited to a wireless channel, and various other media that can store, include, and/or carry instructions and/or data.

A network architecture and a service scenario described in embodiments of this application are intended to describe the technical solutions in embodiments of this application more clearly, and do not constitute a limitation on the technical solutions provided in embodiments of this application. A person of ordinary skill in the art may learn that: With evolution of the network architecture and emergence of a new service scenario, the technical solutions provided in embodiments of this application are also applicable to similar technical problems.

In descriptions of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in descriptions of this application, unless otherwise specified, "at least one" means one or more. "A plurality of" means two or more. In addition, to clearly describe the technical solutions in embodiments of this application, words such as "first" and "second" are used in embodiments of this application to distinguish between same items or similar items that have basically the same functions or purposes. A person skilled in the art may understand that the words such as "first" and "second" do not limit a quantity and an execution sequence, and the words such as "first" and "second" do not indicate a definite difference either.

It should be noted that, in embodiments of this application, "of", "corresponding, relevant" and "corresponding" may be interchangeably used sometimes, and signaling and a message may be interchangeably used sometimes. It should be noted that: When a difference is not emphasized, meanings to be expressed are consistent.

Names of messages between network elements or names of parameters in messages in the following embodiments of this application are merely examples, and may alternatively be other names during specific implementation. This is not specifically limited in embodiments of this application.

In embodiments of this application, a "signal" may also be a "channel" or a "signal resource". Sometimes, the three may be replaced with each other. This is not limited in this application.

In embodiments of this application, "type D QCL" and a "spatial relation" may be replaced with each other; "QCL" and a "spatial relation" may be replaced with each other; or a "TCI" and a "spatial relation" may be replaced with each other. Ibis is not limited in this application.

For ease of understanding, the following specifically describes the communication method provided in embodiments of this application with reference to the accompanying drawings.

Figure 9:
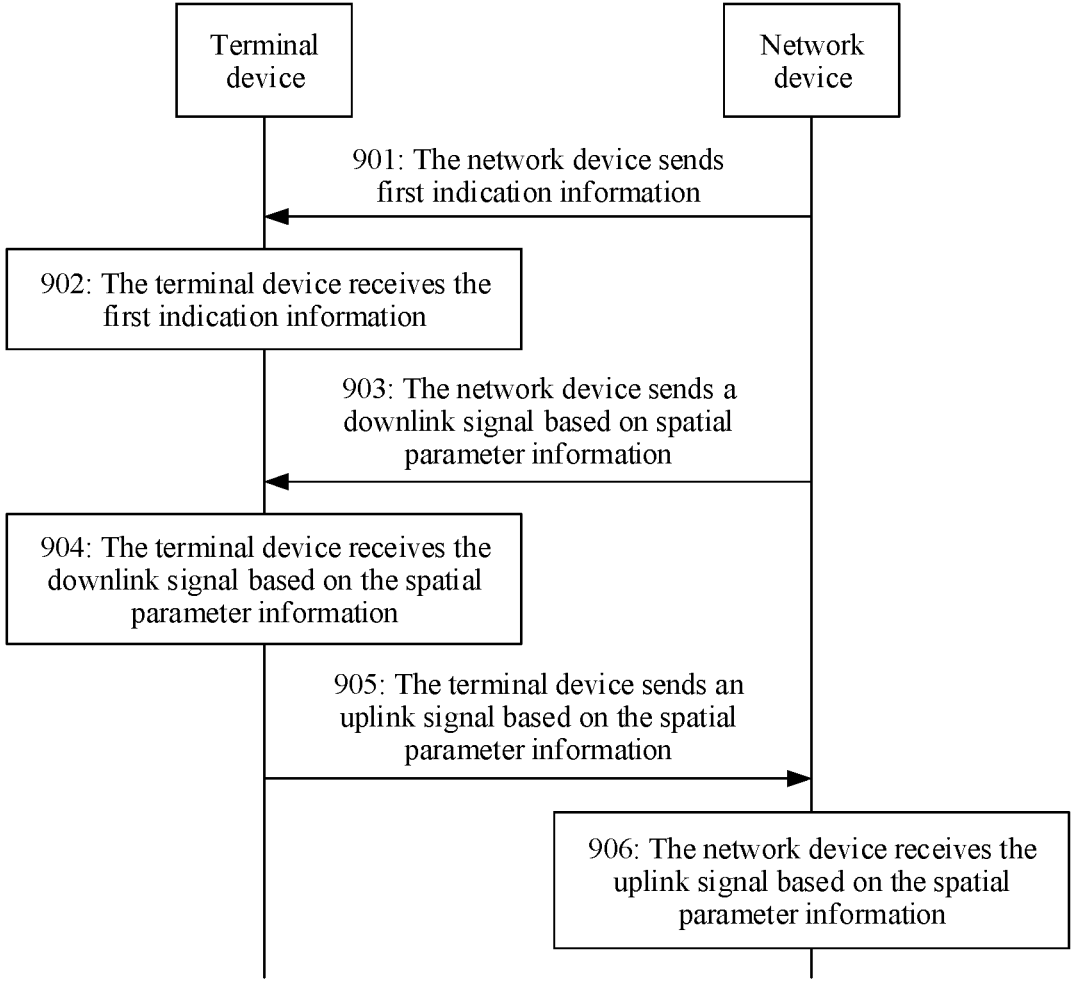
FIG. 9 is a schematic diagram of signal interaction according to an embodiment of this application.

As shown in FIG. 9, an embodiment of this application provides a communication method, including the following steps.

901: A network device sends first indication information, where the first indication information indicates spatial parameter information of at least two types of signals.

The at least two types of signals may include at least two of a PUCCH, a PUSCH, an SRS, a PTRS, a DMRS, a PDCCH, a PDSCH, a TRS, a CSI-RS, or an SSB. The SSB may include one or more of the following: a primary synchronization signal (PSS), a secondary synchronization signal (SSS), and a physical broadcast channel (PBCH).

It should be understood that the at least two types of signals may include any two types of signals, any three types of signals, any four types of signals, or any five types of signals of the PUCCH, the PUSCH, the SRS, the PTRS, the DMRS, the PDCCH, the PDSCH, the TRS, the CSI-RS, or the SSB. This is not limited in this application.

For example, the at least two types of signals may include the PDSCH and the PDCCH. Alternatively, the at least two types of signals may include the PDSCH and the PUCCH. Alternatively, the at least two types of signals may include the PDSCH and the CSI-RS. Alternatively, the at least two types of signals may include the PDSCH and the SRS. Alternatively, the at least two types of signals may include the PDSCH and the PUSCH. Alternatively, the at least two types of signals may include the PDCCH and the PUCCH. Alternatively, the at least two types of signals may include the PDSCH, the PDCCH, the PUCCH, and the PUSCH. Alternatively, the at least two types of signals may include the PDSCH, the PDCCH, and the PUCCH. Alternatively, the at least two types of signals may include the PDSCH, the PDCCH, and the CSI-RS. Alternatively, the at least two types of signals may include the PUSCH and the PUCCH. Alternatively, the at least two types of signals may include the PUSCH, the PUCCH, and the SRS. Alternatively, the at least two types of signals may include the PUCCH and the SRS.

Any one of the at least two types of signals may be indicated by using RRC signaling or MAC CE signaling (where the indication may be an explicit indication, for example, an identifier of a type of signal is carried in the RRC signaling or the MAC CE signaling; or may be an implicit indication, for example, a type of signal is indicated by using a location of a field in the RRC signaling or the MAC CE signaling). Alternatively, any one of the at least two types of signals may be predefined (in a protocol). The at least two types of signals may be predefined. For example, it may be predefined that the at least two types of signals include all signals in a BWP or on a CC in/on which the first indication information is located (where an SRS/a CSI-RS used for beam training or beam management may be excluded). Alternatively, at least one type of signal may be predefined, and another type of signal is indicated by the network device. For example, it is predefined that the PDSCH is indicated by using a TCI field in DCI, and a MAC CE indicates that the TCI field in the DCI also indicates another signal (e.g., a signal such as the TRS or the CSI-RS).

It should be understood that the first indication information indicates the spatial parameter information of the at least two types of signals, that is, the spatial parameter information indicated by the first indication information may be applied to transmission of the at least two types of signals.

For example, assuming that the at least two types of signals may include the PDSCH and the PDCCH, the spatial parameter information indicated by the first indication information may be used to transmit the PDSCH and the PDCCH. For example, a terminal device may receive the PDSCH and the PDCCH based on the spatial parameter information indicated by the first indication information.

It should be understood that the spatial parameter information in this application may be a TCI-state, may be a TCI-state identifier, may be a spatial relation, may be QCL information, or may be type D QCL information. This is not limited in this application.

It should be noted that, that the spatial parameter information indicated by the first indication information is used to transmit the at least two types of signals may be understood as that a reference signal resource or a resource identifier corresponding to the spatial parameter information and the at least two types of signals meet a QCL relationship, the reference signal resource or the resource identifier corresponding to the spatial parameter information and the at least two types of signals use a same spatial filter/similar spatial filters, the reference signal resource or the resource identifier corresponding to the spatial parameter information and the at least two types of signals use same QCL information, the reference signal resource or the resource identifier corresponding to the spatial parameter information and the at least two types of signals use a same TCI-state, or the reference signal resource or the resource identifier corresponding to the spatial parameter information and the at least two types of signals have a same spatial correlation parameter/similar spatial correlation parameters. This is not limited in this application.

In a possible design, the first indication information may be carried in a target field in the DCI. For example, the target field may be the TCI field in the DCI. Alternatively, one target field may be added to the DCI. For example, one target field (field) may be added to DCI in a format 1-1 in the Rel-16 standard protocol 38.212 to carry the first indication information. For another example, another field may be reused in the DCI in the format 1-1 in the Rel-16 standard protocol 38.212 to carry the first indication information.

In another possible design, the first indication information may be carried in RRC signaling or MAC CE signaling. In other words, the first indication information may be carried by the RRC signaling or the MAC CE signaling.

It should be noted that, the spatial parameter information indicated by the first indication information may take effect after a target time period, and the target time period is related to a capability of the terminal device. The terminal device may report the target time period to the network device by using capability information, and the capability information indicates the target time period. For example, the capability information may indicate a quantity of time units included (included) in the target time period and/or a length of the target time period (absolute time). A time unit may be a symbol, a slot, a subframe, or a radio frame. A start time point of the target time period may be a time point at which the terminal device receives the first indication information. For example, the target time period may be timeDurationForQCL.

In a possible design, the length of the target time period is determined based on the quantity of time units of the target time period and a minimum value of an SCS of the at least two types of signals.

For example, if the at least two types of signals include the PDCCH and the PUCCH, an SCS of the PDCCH is 60 kHz, an SCS of the PUCCH is 120 kHz, and the quantity of time units of the target time period is 14 symbols, after 14 symbols at 60 kHz, the spatial parameter information indicated by first indication information may be applied to transmission of the PDCCH and the PUCCH. In other words, after the 14 symbols at 60 kHz, the terminal device may receive the PDCCH and send the PUCCH based on the spatial parameter information indicated by the first indication information.

In another possible design, if the at least two types of signals include at least one uplink signal and at least one downlink signal, the terminal device may receive the at least one downlink signal based on the spatial parameter information after the target time period, where a length of the target time period is determined based on a quantity of time units of the target time period and a minimum value of an SCS of the at least one downlink signal. The terminal device may send the at least one uplink signal based on the spatial parameter information after the target time period, where the length of the target time period is determined based on the quantity of time units of the target time period and a minimum value of an SCS of the at least one uplink signal.

For example, if the at least one downlink signal includes the PDSCH and the PDCCH, an SCS of the PDSCH is 120 kHz, an SCS of the PDCCH is 60 kHz, and the quantity of time units of the target time period is 14 symbols, after 14 symbols at 60 kHz, the spatial parameter information indicated by first indication information may be applied to transmission of the PDSCH and the PDCCH. In other words, after the 14 symbols at 60 kHz, the terminal device may receive the PDSCH and the PDCCH based on the spatial parameter information indicated by the first indication information.

In still another possible design, if the at least two types of signals include a first signal, the terminal device may send or receive the first signal based on the spatial parameter information, where a length of the target time period is determined based on a quantity of time units of the target time period and an SCS of the first signal.

For example, it is assumed that the at least two types of signals include the PDCCH and the PUCCH, an SCS of the PDCCH is 60 kHz, an SCS of the PUCCH is 120 kHz, and the quantity of time units of the target time period is 14 symbols. If the first signal is the PDCCH, after the terminal device receives the first indication information and after 14 symbols at 60 kHz, the spatial parameter information indicated by the first indication information may be applied to receiving the PDCCH. In other words, after the 14 symbols at 60 kHz, the terminal device may receive the PDCCH based on the spatial parameter information indicated by the first indication information. If the first signal is the PUCCH, after the terminal device receives the first indication information and after 14 symbols at 120 kHz, the spatial parameter information (e.g., the type D QCL) indicated by the first indication information may be applied to sending the PUCCH. In other words, after the 14 symbols at 120 kHz, the terminal device may send the PUCCH based on the spatial parameter information (e.g., the type D QCL) indicated by the first indication information.

In yet another possible design, if the at least two types of signals include a first signal, the at least two types of signals are sent and/or received based on the spatial parameter information, where a length of the target time period is determined based on a quantity of time units of the target time period and an SCS of the first signal.

For example, it is assumed that the at least two types of signals include the PDCCH and the PUCCH, an SCS of the PDCCH is 60 kHz, and an SCS of the PUCCH is 120 kHz.

If the first signal is the PDCCH, after the terminal device receives the first indication information and after 14 symbols at 60 kHz, the spatial parameter information indicated by the first indication information may be applied to transmission of the PDCCH and the PUCCH. In other words, after the 14 symbols at 60 kHz, the terminal device may receive the PDCCH and send the PUCCH based on the spatial parameter information indicated by the first indication information. If the first signal is the PDCCH, after the terminal device receives the first indication information and after 14 symbols at 120 kHz, the spatial parameter information indicated by the first indication information may be applied to transmission of the PDCCH and the PUCCH. In other words, after the 14 symbols at 120 kHz, the terminal device may receive the PDCCH and send the PUCCH based on the spatial parameter information indicated by the first indication information. The first signal may be determined by the terminal device based on the capability of the terminal device, may be predefined, or may be indicated by using the MAC CE signaling or the RRC signaling. This is not limited in this application.

In addition, when the first indication information indicates a plurality of pieces of spatial parameter information, at least one of the at least two types of signals corresponds to a first piece of spatial parameter information in the plurality of pieces of spatial parameter information. The at least one type of signal may not include the PDSCH. For example, when the first indication information indicates the plurality of pieces of spatial parameter information, at least one type of signal of the PUCCH, the PUSCH, the SRS, the PTRS, the DMRS, the PDCCH, the TRS, the CSI-RS, or the SSB may correspond to the first piece of spatial parameter information in the plurality of pieces of spatial parameter information. Alternatively, the at least one type of signal may not include the PDSCH and the PUSCH.

For example, assuming that the first indication information is carried in the TCI field in the DCI, when the TCI field indicates two TCI-states, the PDCCH and the CSI-RS may be transmitted by using the first TCI-state.

In some embodiments, the terminal device may receive second indication information, where the second indication information indicates the terminal device to obtain the first indication information. In other words, the second indication information indicates to enable the first indication information. In other words, the second indication information indicates the terminal device to receive the first indication information. In other words, the second indication information indicates that the first indication information indicates the spatial parameter information of the at least two types of signals. The second indication information may be carried in RRC signaling, MAC CE signaling, or other signaling. To be specific, the first indication information may be enabled (enable), by using the RRC signaling or the other signaling, to indicate a function of the spatial parameter information of the at least two types of signals. Otherwise, the terminal device may not learn that the first indication information indicates the spatial parameter information of the at least two types of signals.

902: The terminal device receives the first indication information.

For related descriptions of the first indication information, refer to step 901. Details are not described herein again.

It should be noted that the at least two types of signals may include at least two types of uplink signals, the at least two types of signals may include at least two types of downlink signals, or the at least two types of signals may include at least one type of uplink signal and at least one type of downlink signal.

When the at least two types of signals include the downlink signal, steps 903 and 904 may be performed.

903: The network device sends the downlink signal based on the spatial parameter information.

When the at least two types of signals include the downlink signal, the spatial correlation parameter information may include the QCL information, and the QCL information may indicate a spatial correlation parameter (or referred to as a spatial correlation characteristic) of the downlink signal. Alternatively, when the at least two types of signals include the downlink signal, the spatial correlation parameter information may include TCI information. Alternatively, when the at least two types of signals include the downlink signal, the spatial correlation parameter information may include TCI-state information.

The downlink signal may include at least one of the PTRS, the DMRS, the PDCCH, the PDSCH, the TRS, the CSI-RS, or the SSB. The DMRS may be a DMRS used to demodulate the PDCCH or the PDSCH. The PTRS is a PTRS that can be used for phase tracking of a downlink channel.

The network device may send the downlink signal based on the spatial parameter information, in other words, the network device may send the downlink signal by using the spatial parameter information.

The spatial parameter information of the downlink signal may take effect after the target time period. For example, the network device may send the downlink signal based on the spatial parameter information after the target time period. For related descriptions of the target time period, refer to step 901. Details are not described herein again.

904: The terminal device receives the downlink signal based on the spatial parameter information.

The terminal device may receive the downlink signal based on the spatial parameter information, in other words, the terminal device may receive the downlink signal by using the spatial parameter information.

The spatial parameter information of the downlink signal may take effect after the target time period. For example, the terminal device may receive the downlink signal based on the spatial parameter information after the target time period. For related descriptions of the target time period, refer to step 901. Details are not described herein again.

When the at least two types of signals include the uplink signal, steps 905 and 906 may be performed.

905: The terminal device sends the uplink signal based on the spatial parameter information.

When the at least two types of signals include the uplink signal, the spatial correlation parameter information may include spatial relation information, and the spatial relation information may indicate a spatial correlation parameter (or referred to as a spatial correlation characteristic) of the uplink signal.

The uplink signal may include at least one of the PUCCH, the PUSCH, the SRS, the PTRS, or the DMRS. The DMRS may be a DMRS used to demodulate the PUCCH or the PUSCH. The PTRS is a PTRS that can be used for phase tracking of an uplink channel.

In a possible design, the spatial parameter information of the uplink signal is type D QCL. For example, when the uplink signal is the SRS, the spatial parameter information is the type D QCL.

The terminal device may send the uplink signal based on the spatial parameter information, in other words, the terminal device may send the uplink signal by using the spatial parameter information.

The spatial parameter information of the uplink signal may take effect after the target time period. For example, the terminal device may send the uplink signal based on the spatial parameter information after the target time period. For related descriptions of the target time period, refer to step 901. Details are not described herein again.

906: The network device receives the uplink signal based on the spatial parameter information.

The network device may receive the uplink signal based on the spatial parameter information, in other words, the network device may receive the uplink signal by using the spatial parameter information.

The spatial parameter information of the uplink signal may take effect after the target time period. For example, the network device may receive the uplink signal based on the spatial parameter information after the target time period.

It should be noted that, in this embodiment of this application, after step 901 and step 902 are performed, only step 903 and step 904 may be performed, only step 905 and step 906 may be performed, or steps 903 to 906 may all be performed, and an execution sequence of step 903 and step 905 is not limited.

According to the method provided in this embodiment of this application, the terminal device may receive the first indication information, and send and/or receive the at least two types of signals based on the spatial parameter information indicated by the first indication information. In a current technology, a base station needs to separately update, by using a plurality of pieces of signaling, beams corresponding to different signals/channels, signaling overheads are high, and an update speed is slow. In this application, the first indication information may indicate the spatial parameter information (namely, beams) of the at least two types of signals, so that the terminal device can quickly complete a beam handover for a plurality of types of signals in a movement scenario, to effectively avoid link interruption and reduce signaling.

Figure 10:
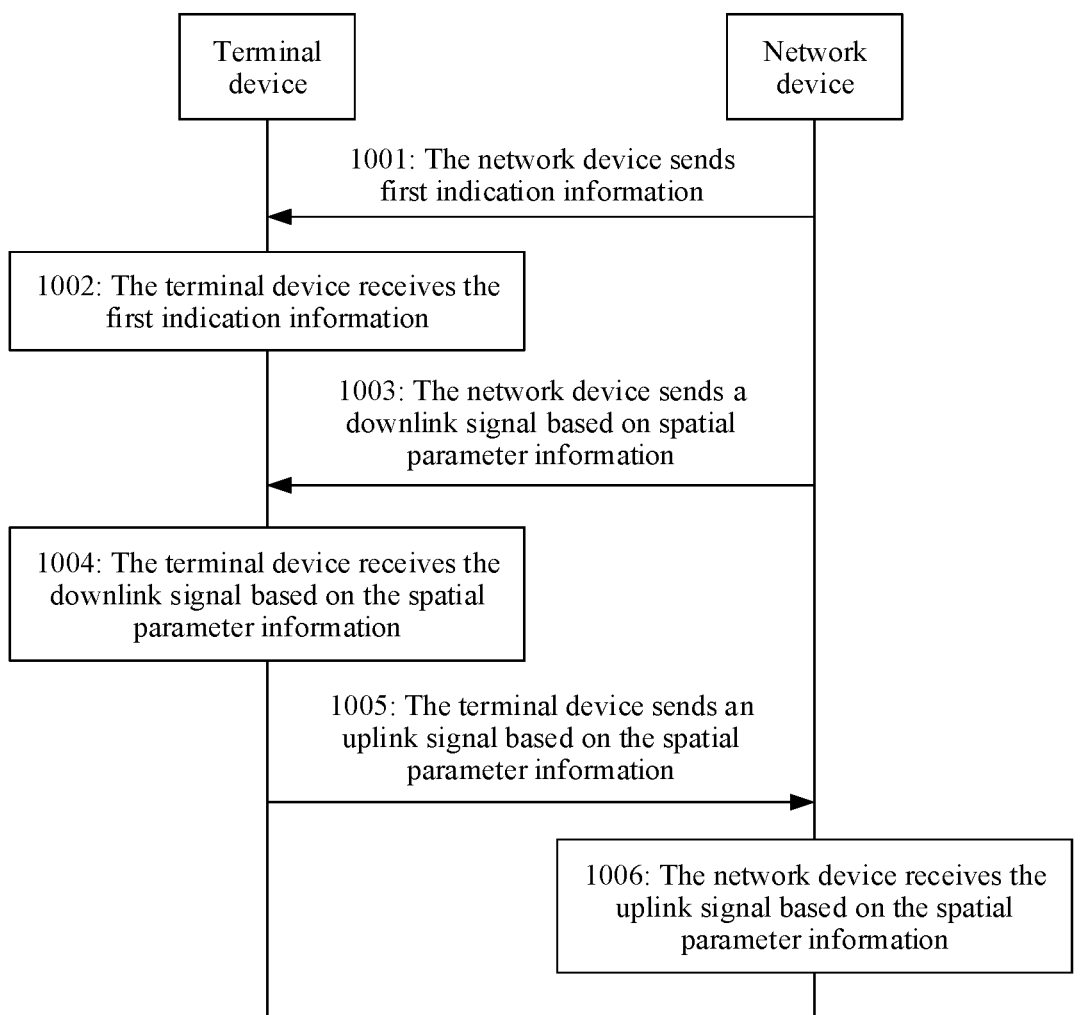
FIG. 10 is a schematic diagram of other signal interaction according to an embodiment of this application.

As shown in FIG. 10, another embodiment of this application provides a communication method, including the following steps.

1001: A network device sends first indication information, where the first indication information indicates spatial parameter information of one of at least two types of signals.

In a possible design, a target set may be predefined by using RRC signaling or MAC CE signaling. The target set includes the at least two types of signals. If spatial parameter information of one signal in the target set is updated, spatial parameter information of another signal in the target set is also updated.

The at least two types of signals may include at least two of a PUCCH, a PUSCH, an SRS, a PTRS, a DMRS, a PDCCH, a PDSCH, a TRS, a CSI-RS, or an SSB. For specific descriptions, refer to related descriptions of step 901. Details are not described herein again.

Any one of the at least two types of signals is indicated by using RRC signaling or MAC CE signaling, or may be predefined. For specific descriptions, refer to related descriptions of step 901. Details are not described herein again.

In some embodiments, a terminal device may receive second indication information, where the second indication information indicates the terminal device to obtain the first indication information. For specific descriptions of the second indication information, refer to step 901. Details are not described herein again.

1002: The terminal device receives the first indication information.

For related descriptions of the first indication information, refer to step 1001. Details are not described herein again.

For steps 1003 to 1006, refer to steps 903 to 906. Details are not described herein again.

According to the method provided in this embodiment of this application, the terminal device may receive the first indication information, and send and/or receive the at least two types of signals based on the spatial parameter information indicated by the first indication information. In a current technology, a base station needs to separately update, by using a plurality of pieces of signaling, beams corresponding to different signals/channels, signaling overheads are high, and an update speed is slow. In this application, the terminal device can send and/or receive the at least two types of signals based on the first indication information, so that the terminal device can quickly complete a beam handover for a plurality of types of signals in a movement scenario, to effectively avoid link interruption and reduce signaling.

In the foregoing embodiments provided in this application, the method provided in embodiments of this application is described from perspectives of the terminal device, the network device, and interaction between the terminal device and the network device. Optionally, in the foregoing embodiments provided in this application, network devices may interact with each other and the terminal device may interact with the network device. To implement the functions in the method provided in embodiments of this application, the terminal device and the network device each may include a hardware structure and/or a software module, to implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

When each functional module is obtained through division based on each corresponding function, FIG. 11 is a possible schematic diagram of a structure of an apparatus 11 in the foregoing embodiments. The apparatus may be a terminal device, and the terminal device includes a transceiver unit 1101. In this embodiment of this application, the transceiver unit 1101 is configured to receive first indication information, where the first indication information indicates spatial parameter information of at least two types of signals, or the first indication information indicates spatial parameter information of one of the at least two types of signals. The transceiver unit 1101 is further configured to send and/or receive the at least two types of signals based on the spatial parameter information.

In the method embodiment shown in FIG. 9 or FIG. 10, the transceiver unit 1101 is configured to support the terminal device in performing the processes 902, 904, and 905 in FIG. 9 and the processes 1002, 1004, and 1005 in FIG. 10. All related content of the steps in the foregoing method embodiments may be cited in function descriptions of corresponding functional modules. Details are not described herein again.

When each functional module is obtained through division based on each corresponding function, FIG. 12 is a possible schematic diagram of a structure of an apparatus 12 in the foregoing embodiments. The apparatus may be a network device, and the network device includes a transceiver unit 1201. In this embodiment of this application, the transceiver unit 1201 is configured to send first indication information, where the first indication information indicates spatial parameter information of at least two types of signals, or the first indication information indicates spatial parameter information of one of the at least two types of signals. The transceiver unit 1201 is further configured to send and/or receive the at least two types of signals based on the spatial parameter information.

In the method embodiment shown in FIG. 9 or FIG. 10, the transceiver unit 1201 is configured to support a network device in performing the processes 901, 903, and 906 in FIG. 9 and the processes 1001, 1003, and 1006 in FIG. 10. All related content of the steps in the foregoing method embodiments may be cited in function descriptions of corresponding functional modules. Details are not described herein again.

For example, the terminal device or the network device in the foregoing apparatus embodiments may correspond to the terminal device or the network device in the method embodiments, and a corresponding module or unit performs a corresponding step. For example, a communication module (a transceiver) may perform a sending step and/or a receiving step in the method embodiments, and other steps than the sending step and the receiving step may be performed by a processing unit (a processor). For a function of a specific unit, refer to a corresponding method embodiment. A sending unit and a receiving unit may form a transceiver unit, and a transmitter and a receiver may form a transceiver, to jointly implement sending and receiving functions. There may be one or more processors.

For example, functions of the terminal device or the network device may be implemented by using a chip, and the processing unit may be implemented by using hardware or software. When the processing unit is implemented by using the hardware, the processing unit may be a logic circuit, an integrated circuit, or the like. When the processing unit is implemented by using the software, the processing unit may be a general-purpose processor, and is implemented by reading software code stored in a storage unit. The storage unit may be integrated into the processor, or may be located outside the processor and exist independently.

The terminal device or the network device in the foregoing apparatus embodiments may correspond to the terminal device or the network device in the method embodiments, and a corresponding module or unit performs a corresponding step. For example, a sending module (a transmitter) performs a sending step in the method embodiments, a receiving module (a receiver) performs a receiving step in the method embodiments, and other steps than the sending step and the receiving step may be performed by a processing module (a processor). For a function of a specific module, refer to the corresponding method embodiment. The sending module and the receiving module may form a transceiver module, and the transmitter and the receiver may form a transceiver, to jointly implement sending and receiving functions. There may be one or more processors.

Module or unit division in embodiments of this application is an example, is merely logical function division, and may be other division in actual implementations. In addition, functional modules in embodiments of this application may be integrated into one processor, may exist alone physically, or two or more modules may be integrated into one module. The integrated module may be implemented in a form of hardware, or may be implemented in a form of a software functional module. For example, in embodiments of this application, the receiving unit and the sending unit may be integrated into the transceiver unit.

All or some of the methods provided in embodiments of this application may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (e.g., a coaxial cable, an optical fiber, or a digital subscriber line (DSL)) or wireless (e.g., infrared, radio, or microwave) manner. The computer-readable storage medium may be any usable medium accessible by a computer, or a data storage device, such as a server or a data center, integrating one or more usable media. The usable medium may be a magnetic medium (e.g., a floppy disk, a hard disk, or a magnetic tape), an optical medium (e.g., a digital video disc (DVD)), a semiconductor medium (e.g., a solid-state drive (SSD)), or the like.

Clearly, a person skilled in the art can make various modifications and variations to embodiments of this application without departing from the spirit and scope of this application. In this way, this application is intended to cover these modifications and variations provided that they fall within the scope of protection defined by the following claims and their equivalent technologies.

What is claimed is:

1. A communication method carried out by a terminal device or a chip of the terminal device, the method comprising:

receiving first indication information indicating spatial parameter information of at least two types of signals, wherein the spatial parameter information indicates a spatial relationship between the at least two types of signals; and sending and/or receiving the at least two types of signals based on the spatial parameter information, wherein the spatial parameter information takes effect after a target time period that is related to a capability of the terminal device, and wherein the target time period comprises a quantity of N time units, where N is a positive integer, and wherein the length of the target time period is determined based on minimum subcarrier spacing (SCS) of at least two SCSs corresponding to at least two bandwidth parts (BWPs).

2. The communication method according to claim 1, wherein the at least two types of signals comprise at least two of a physical uplink control channel (PUCCH), a physical uplink shared channel (PUSCH), a sounding reference signal (SRS), a phase tracking reference signal (PTRS), a demodulation reference signal (DMRS), a physical downlink control channel (PDCCH), a physical downlink shared channel (PDSCH), a tracking reference signal (TRS), a channel state information-reference signal (CSI-RS), or a synchronization signal block (SSB).

3. The communication method according to claim 1, wherein the first indication information is carried in a transmission configuration indicator (TCI) field in downlink control information (DCI); or the first indication information is carried in radio resource control (RRC) signaling or media access control element (MAC CE) signaling.

4. The communication method according to claim 1, wherein the method further comprises reporting capability information that indicates the target time period.

5. A communication apparatus, comprising:

at least one processor; and a memory storing programming instructions for execution by the at least one processor, the programming instructions instructing the network device to perform operations comprising:

receiving first indication information indicating spatial parameter information of at least two types of signals, wherein the spatial parameter information indicates a spatial relationship between the at least two types of signals; and sending and/or receiving the at least two types of signals based on the spatial parameter information, wherein the spatial parameter information takes effect after a target time period that is related to a capability of the terminal device, and wherein the target time period comprises a quantity of N time units, where N is a positive integer, and wherein the length of the target time period is determined based on minimum subcarrier spacing (SCS) of at least two SCSs corresponding to at least two bandwidth parts (BWPs).

6. The communication apparatus according to claim 5, wherein the at least two types of signals comprise at least two of a physical uplink control channel (PUCCH), a physical uplink shared channel (PUSCH), a sounding reference signal (SRS), a phase tracking reference signal (PTRS), a demodulation reference signal (DMRS), a physical downlink control channel (PDCCH), a physical downlink shared channel (PDSCH), a tracking reference signal (TRS), a channel state information-reference signal (CSI-RS) or a synchronization signal block (SSB).

7. The communication apparatus according to claim 5, wherein the first indication information is carried in a transmission configuration indicator (TCI) field in downlink control information (DCI); or the first indication information is carried in radio resource control (RRC) signaling or media access control element (MAC CE) signaling.

8. The communication apparatus according to claim 5, wherein the operations further comprise reporting capability information, wherein the capability information indicates the target time period.

9. The communication method according to claim 2, wherein in accordance with the first indication information indicating a plurality of pieces of spatial parameter information, at least one of the at least two types of signals corresponds to a first piece of spatial parameter information in the plurality of pieces of spatial parameter information.

10. The communication method according to claim 1, wherein the at least two types of signals comprise an uplink signal, and wherein the spatial parameter information of the uplink signal is type D quasi-colocation (QCL) information.

11. The communication apparatus according to claim 6, wherein in accordance with the first indication information indicating a plurality of pieces of spatial parameter information, at least one of the at least two types of signals corresponds to a first piece of spatial parameter information in the plurality of pieces of spatial parameter information.

12. The communication apparatus according to claim 5, wherein the at least two types of signals comprise an uplink signal, and wherein the spatial parameter information of the uplink signal is type D quasi-colocation (QCL) information.

13. A non-transitory computer-readable storage medium, wherein the computer-readable storage medium stores computer programs, and when the computer programs are executed by a computer, the computer is enabled to perform operations comprising:

receiving first indication information indicating spatial parameter information of at least two types of signals, wherein the spatial parameter information indicates a spatial relationship between the at least two types of signals; and sending and/or receiving the at least two types of signals based on the spatial parameter information, wherein the spatial parameter information takes effect after a target time period that is related to a capability of the terminal device, and wherein the target time period comprises a quantity of N time units, where N is a positive integer, and wherein the length of the target time period is determined based on minimum subcarrier spacing (SCS) of at least two SCSs corresponding to at least two bandwidth parts (BWPs).

14. The non-transitory computer-readable storage medium according to claim 13, wherein the at least two types of signals comprise at least two of a physical uplink control channel (PUCCH), a physical uplink shared channel (PUSCH), a sounding reference signal (SRS), a phase tracking reference signal (PTRS), a demodulation reference signal (DMRS), a physical downlink control channel (PDCCH), a physical downlink shared channel (PDSCH), a tracking reference signal (TRS), a channel state information-reference signal (CSI-RS), or a synchronization signal block (SSB).

15. The non-transitory computer-readable storage medium according to claim 13, wherein the first indication information is carried in a transmission configuration indicator (TCI) field in downlink control information (DCI); or the first indication information is carried in radio resource control (RRC) signaling or media access control element (MAC CE) signaling.

16. The non-transitory computer-readable storage medium according to claim 13, wherein the operations comprise reporting capability information that indicates the target time period.

* * * * *